(12) United States Patent
Beard et al.

(10) Patent No.: US 10,393,096 B2
(45) Date of Patent: Aug. 27, 2019

(54) ROTARY SWINGING SUBASSEMBLY AND DEVICE FOR COINTEGRATED FLUIDIC MULTIPLEXING AND VOLUMETRIC PUMPING OF A FLUID

(71) Applicant: EVEON, Montbonnot Saint Martin (FR)

(72) Inventors: Jean-Claude Beard, Belley (FR); Arnaud Wattellier, Eybens (FR); Christophe Dehan, Saint Ismier (FR)

(73) Assignee: EVEON (FR)

( * ) Notice: Subject to any disclaimer, the term of this patent is extended or adjusted under 35 U.S.C. 154(b) by 341 days.

(21) Appl. No.: 14/906,368

(22) PCT Filed: Jun. 11, 2014

(86) PCT No.: PCT/FR2014/051416
§ 371 (c)(1),
(2) Date: Jan. 20, 2016

(87) PCT Pub. No.: WO2015/011353
PCT Pub. Date: Jan. 29, 2015

(65) Prior Publication Data
US 2016/0195074 A1 Jul. 7, 2016

(30) Foreign Application Priority Data
Jul. 22, 2013 (FR) .................................. 13 57188

(51) Int. Cl.
*F04B 7/06* (2006.01)
*F04B 53/16* (2006.01)
(Continued)

(52) U.S. Cl.
CPC .............. *F04B 7/06* (2013.01); *F04B 7/0007* (2013.01); *F04B 9/047* (2013.01); *F04B 13/02* (2013.01);
(Continued)

(58) Field of Classification Search
CPC .. F04B 7/06; F04B 13/02; F04B 53/14; F04B 53/148; F04B 53/16; F16K 11/076; F16K 11/0856; F16K 3/22; F16K 3/24; F16K 3/26; F16K 3/364; F16K 13/02; F16K 27/04; F16K 31/44
USPC ............................. 417/500, 442; 137/625.17
See application file for complete search history.

(56) References Cited

U.S. PATENT DOCUMENTS 2,927,570 A * 3/1960 Pringham .............. F02M 69/02
123/179.17
3,168,872 A 2/1965 Pinkerton
(Continued)

FOREIGN PATENT DOCUMENTS

| CN | 101065577 A | 10/2007 |
|---|---|---|
| CN | 101939540 A | 1/2011 |

(Continued)

OTHER PUBLICATIONS

English Translation of DE 3630528 A1 (Klaus).*

*Primary Examiner* — Dominick L Plakkoottam
*Assistant Examiner* — Connor J Tremarche
(74) *Attorney, Agent, or Firm* — Ware, Fressola, Maguire & Barber LLP

(57) ABSTRACT

A reciprocating and rotary subassembly for positive displacement pumping of a fluid includes a hollow body provided with through ducts, a piston received in the cavity, with which it co-operates to define a working chamber, the piston having a recess in fluid-flow communication with the working chamber, and being suitable for being moved in reciprocating and rotary manner to place or not to place the recess facing a duct and to cause the volume of the working chamber to vary, and a sleeve provided with through orifices, interposed between the piston and the body, and suitable for taking up different successive fluid-flow configurations in each of which each duct is selectively closed or open. A reciprocating and rotary pumping device includes such a reciprocating and rotary subassembly, drive means, and mechanical coupling means.

10 Claims, 17 Drawing Sheets

(51) Int. Cl.
*F04B 53/14* (2006.01)
*F04B 7/00* (2006.01)
*F04B 9/04* (2006.01)
*F04B 13/02* (2006.01)
*F16K 11/076* (2006.01)
*F16K 11/085* (2006.01)

(52) U.S. Cl.
CPC ............ *F04B 53/14* (2013.01); *F04B 53/148* (2013.01); *F04B 53/16* (2013.01); *F16K 11/076* (2013.01); *F16K 11/0856* (2013.01)

(56) References Cited

U.S. PATENT DOCUMENTS

| | | | | |
|---|---|---|---|---|
| 3,486,455 A | * | 12/1969 | Jemison | F04B 7/06 417/321 |
| 3,893,481 A | * | 7/1975 | Watts | F16K 11/078 137/625.17 |
| 4,971,099 A | * | 11/1990 | Cyvas | E21B 34/02 137/270 |
| 5,312,233 A | * | 5/1994 | Tanny | F04B 7/0038 417/316 |
| 5,472,320 A | * | 12/1995 | Weisbrodt | F04B 7/06 417/326 |
| 5,494,420 A | | 2/1996 | Mawhirt et al. | |

FOREIGN PATENT DOCUMENTS

| | | | | |
|---|---|---|---|---|
| CN | 102803725 A | | 11/2012 | |
| DE | 34 41 215 A1 | | 5/1986 | |
| DE | 36 30 528 A1 | | 3/1988 | |
| DE | 3630528 A1 | * | 3/1988 | ................ F04B 7/06 |
| DE | 44 09 994 A1 | | 9/1995 | |
| JP | 2001115951 A | | 4/2001 | |
| WO | 92/16747 A1 | | 10/1992 | |

* cited by examiner

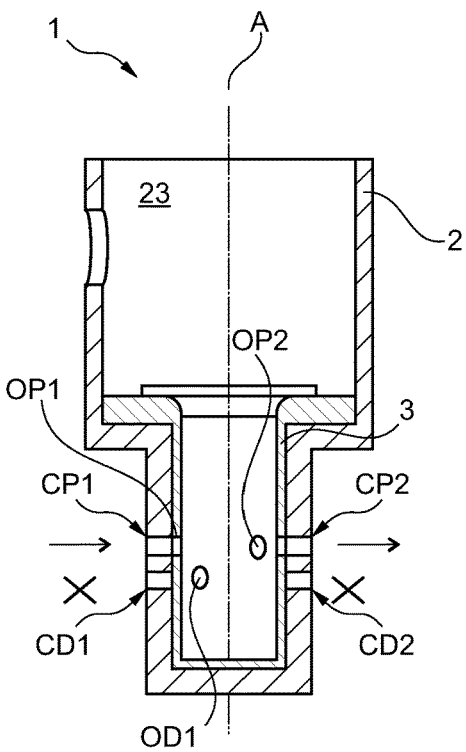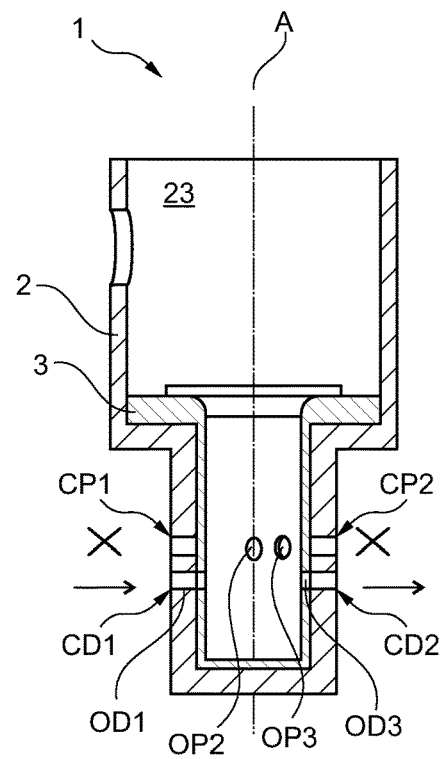
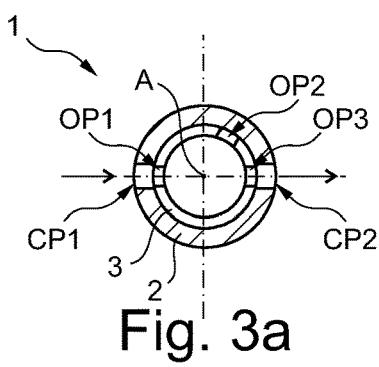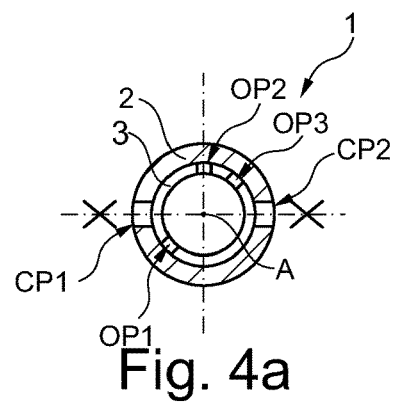
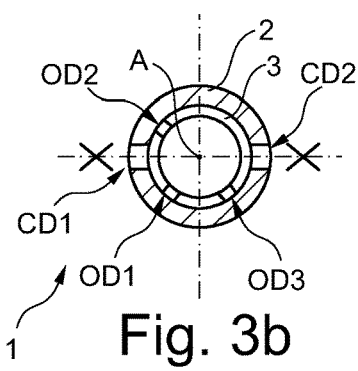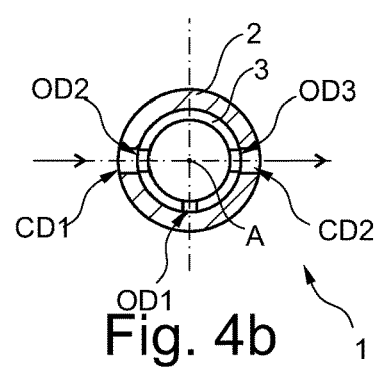

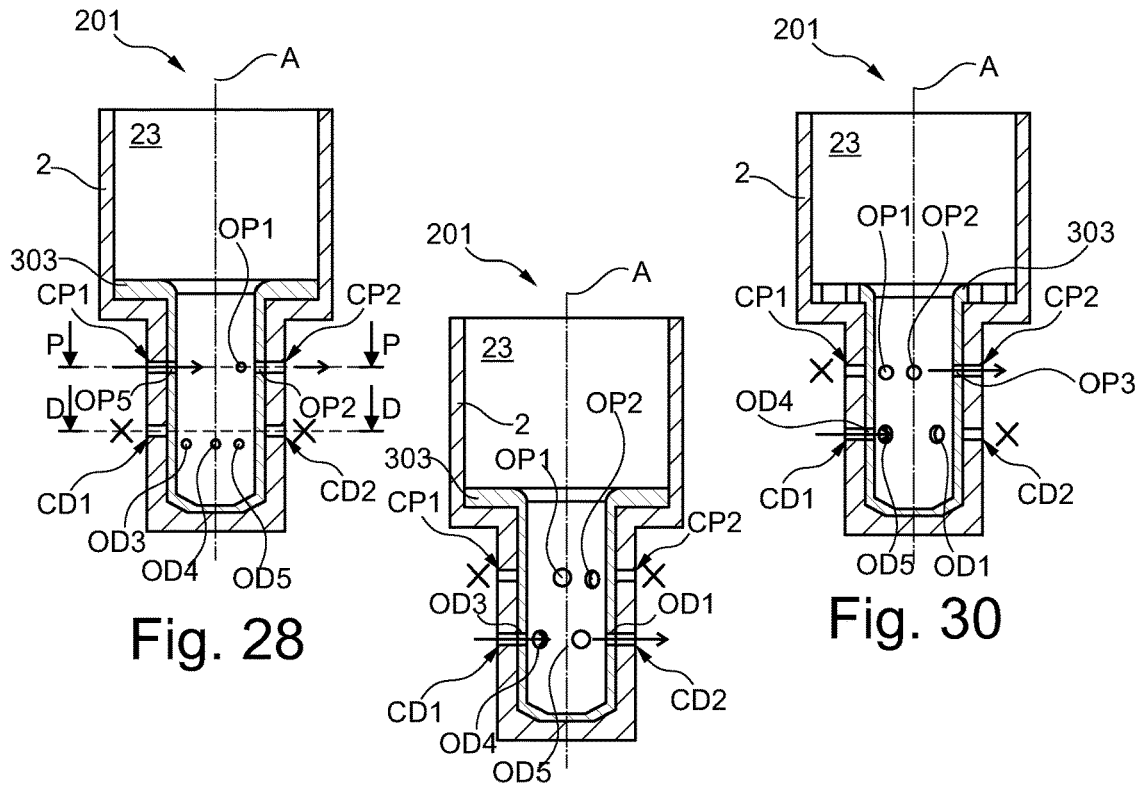
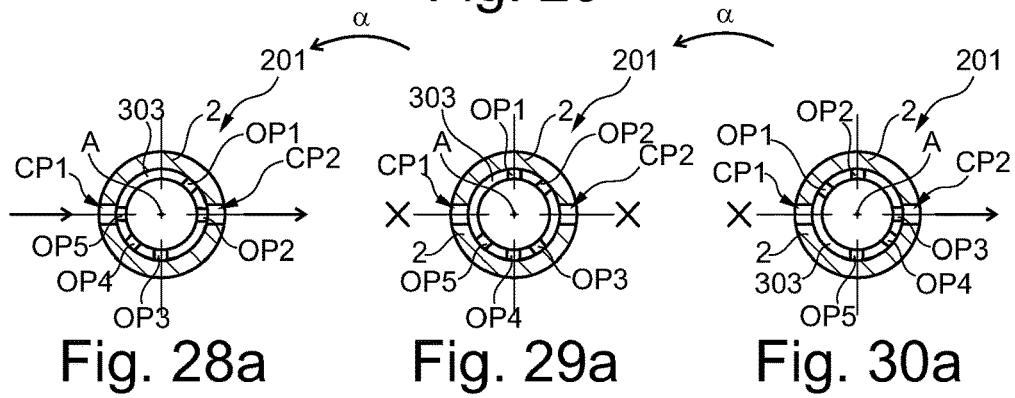
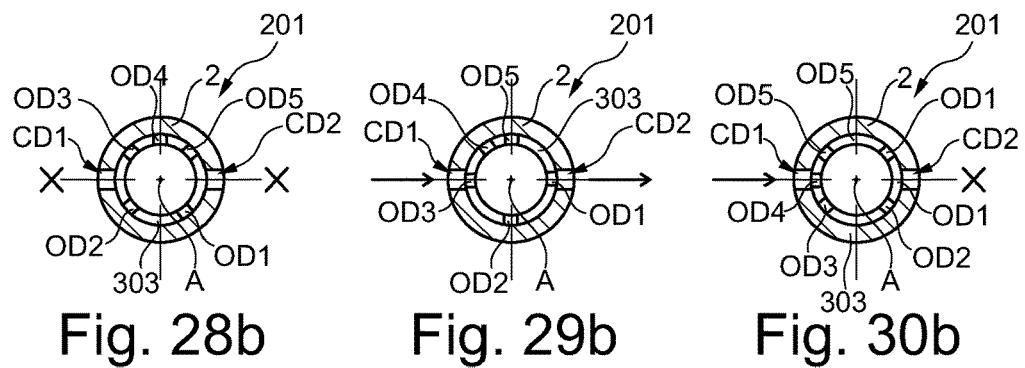

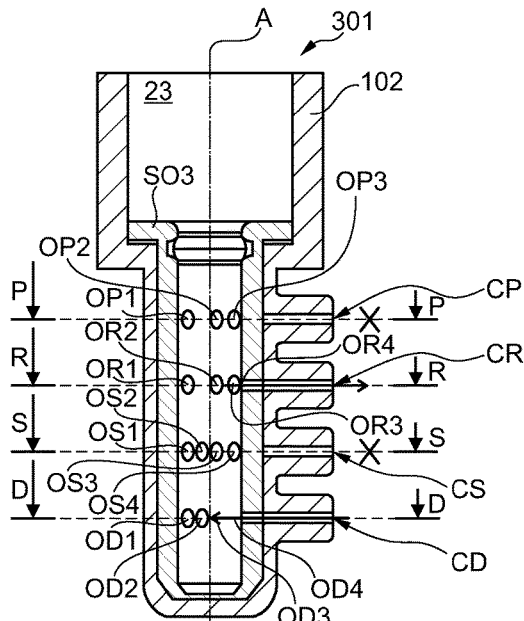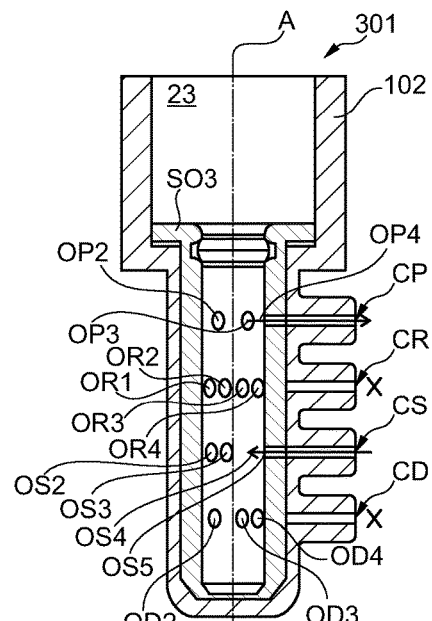
Fig. 45                Fig. 46
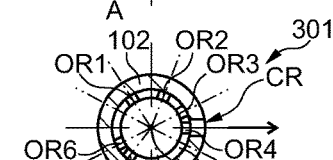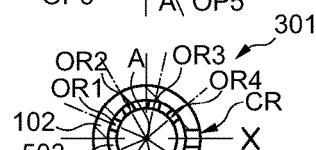
Fig. 45a              Fig. 46a
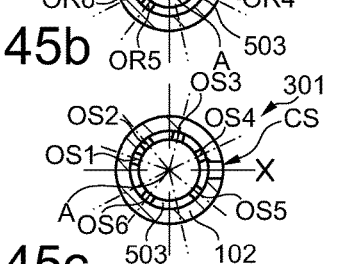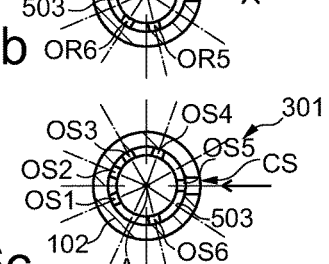
Fig. 45b              Fig. 46b
Fig. 45c              Fig. 46c
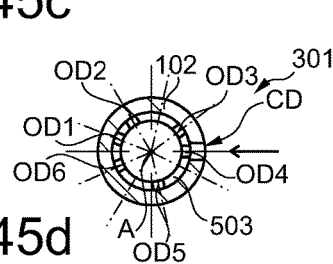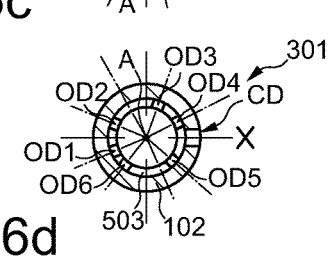
Fig. 45d              Fig. 46d

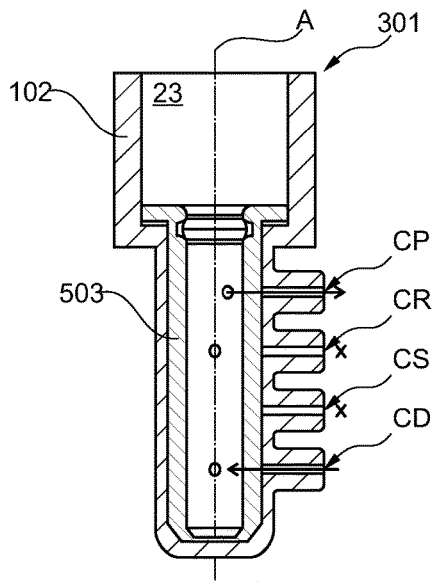
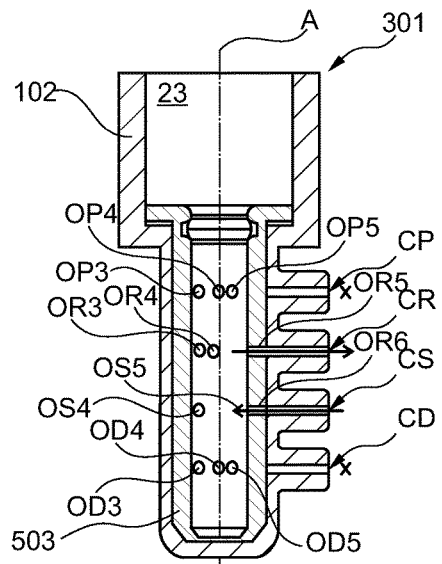
Fig. 47  Fig. 48
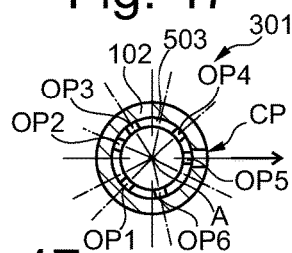
Fig. 47a
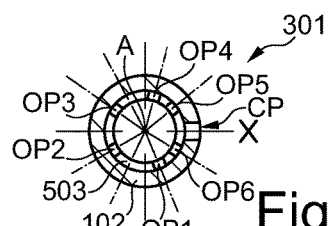
Fig. 48a
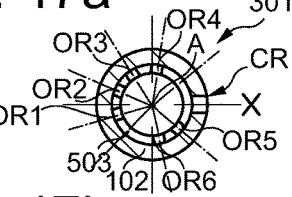
Fig. 47b
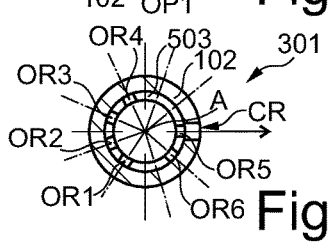
Fig. 48b
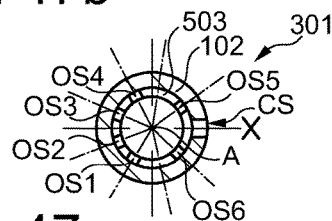
Fig. 47c
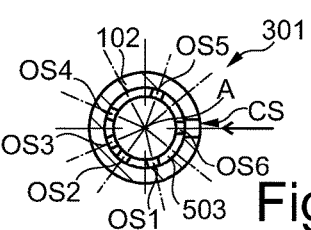
Fig. 48c
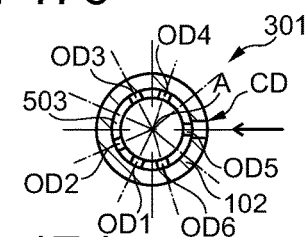
Fig. 47d
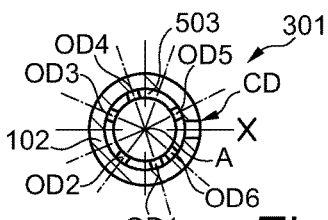
Fig. 48d

ROTARY SWINGING SUBASSEMBLY AND DEVICE FOR COINTEGRATED FLUIDIC MULTIPLEXING AND VOLUMETRIC PUMPING OF A FLUID

CROSS REFERENCE TO RELATED APPLICATIONS

This application is the U.S. National Stage of International Application Number PCT/FR2014/051416 filed on Jun. 11, 2014 which application claims priority under 35 USC § 119 to France Patent Application No. 1357188 filed on Jul. 22, 2013. Both applications are hereby incorporated by reference in their entirety.

TECHNICAL FIELD

The invention relates generally to a reciprocating and rotary sub-assembly for positive displacement pumping of a fluid, and to a reciprocating and rotary pumping device incorporating compact fluid-flow multiplexing means.

PRIOR ART

It is known that pumping devices can be used for producing and/or reconstituting liquid-solid or liquid-liquid mixtures, and/or for administering them (injection, infusion, oral administration, spray, etc.), in particular for medical, aesthetic, and veterinary applications, where such pumping devices make it possible, for example, to feed one or more administration devices with fluid.

In known manner, such a pumping device has a body provided with ducts opening out into a cavity receiving a piston with which it co-operates to define a working chamber. For example, the piston is moved in reciprocating and rotary motion, putting the radial ducts successively into fluid-flow communication with the working chamber so as to suck in and then deliver the fluid. The fluid-flow configuration of such pumping devices is fixed, i.e. the ducts are either open (allowing fluid-flow communication to take place), or closed (not allowing fluid-flow communication to take place) as a function of the position of the piston. The possibilities for use of such pumping devices, such as the one described by Publication U.S. Pat. No. 3,168,872, are therefore limited.

Documents DE 36 30 528 and DE 44 09 994 also describe positive displacement fluid-pumping devices.

SUMMARY OF THE INVENTION

An object of the invention is to remedy that drawback by proposing a reciprocating and rotary subassembly for positive displacement pumping and a reciprocating and rotary pumping device making it possible to increase the number of the external ducts of the subassembly and to open or close said ducts selectively, thereby increasing the fluid-flow configurations for transferring fluid between said ducts.

To this end, the invention provides a reciprocating and rotary subassembly for positive displacement pumping of a fluid, which subassembly includes a hollow body of longitudinal axis defining at least one cavity and having its wall provided with through ducts, a piston received in the cavity, with which it co-operates to define a working chamber, the piston having, in its periphery, at least one recess in fluid-flow communication with the working chamber, the piston being suitable for being moved in reciprocating and rotary manner relative to the body so as to be movable angularly between different operating positions, in each of which the recess is facing or not facing at least one of the ducts, and so as to be movable in translation in such a manner as to cause the volume of the working chamber to vary so as to suck in and then deliver the fluid successively, the reciprocating and rotary subassembly being characterized in that it further includes a sleeve mounted to be movable between the piston and the body, and in that the wall of the sleeve is provided with through orifices, which sleeve is interposed radially between the piston and the body, and is suitable for taking up different successive fluid-flow configurations in the body and in association with each operating position, in each of which fluid-flow configurations each duct is selectively closed when the sleeve prevents fluid-flow communication between the working chamber and the duct or open when an orifice of the sleeve facing the duct allows fluid-flow communication to take place between the working chamber and the duct.

The basic idea of the invention consists in providing a perforated sleeve that is disposed between the body and the piston, and that, by being movable relative to the body, makes it possible to close off or not to close off the ducts so that they are selectively open or closed as a function of the position of the sleeve, and thereby to propose different fluid-flow configurations. The chamber may be movable angularly or longitudinally, or both angularly and longitudinally.

By convention, to facilitate the distinction between the elements, the term "distal" is used below for any element pointing in the direction in which the piston is inserted into the body, and the term "proximal" is used for any element pointing in the opposite direction. The distal and proximal directions are shown diagrammatically by arrows D and P, in particular in FIG. 1. In addition, the references CPi, CRi, CSi, CDi are used for the ducts in general, the index I being replaced with a number to designate a specific duct. Similarly, the references OPi, ORi, OSi, ODi are used for the orifices in general, the index I being replaced with a number to designate a specific orifice.

The reciprocating and rotary subassembly of the invention may advantageously have the following features:

the sleeve is provided with drive shapes designed to be coupled to adjustment means suitable for urging the drive shapes so as to change the angular and/or longitudinal position of the sleeve relative to the body;

the number of orifices is greater than the number of ducts;

the body is provided with at least two proximal ducts situated in a proximal radial plane, with at least two distal ducts situated in a distal radial plane distinct from the proximal radial plane, the sleeve is provided with proximal orifices situated in the proximal radial plane and angularly offset mutually, and with distal orifices situated in the distal radial plane and angularly offset mutually;

the proximal and distal ducts and the proximal and distal orifices are angularly disposed such that the sleeve can successively take up at least two of the following fluid-flow configurations:

a first and a fifth fluid-flow configuration in which only one of the proximal ducts is open, and only one of the distal ducts is open;

a second fluid-flow configuration in which each of the proximal ducts is open, and each of the distal ducts is closed;

a third fluid-flow configuration in which each of the proximal ducts is closed, and each of the distal ducts is open;

a fourth fluid-flow configuration in which each of the proximal ducts and each of the distal ducts is closed;
a sixth fluid-flow configuration in which only one of the proximal ducts is open, and each of the distal ducts is open;
a seventh fluid-flow configuration in which each of the proximal ducts is open, and only one of the distal ducts is open; and
an eighth fluid-flow configuration in which each of the proximal ducts and each of the distal ducts is open;
the body has at least: a proximal duct situated in a proximal radial plane; a distal duct situated in a distal radial plane distinct from the proximal radial plane; and an intermediate proximal duct and an intermediate distal duct, which intermediate ducts are situated respectively in an intermediate proximal radial plane and in an intermediate distal radial plane that are provided between the proximal radial plane and the distal radial plane; the sleeve being provided with at least: proximal orifices situated in the proximal radial plane; distal orifices situated in the distal radial plane; proximal intermediate orifices situated in the radial intermediate plane; and distal intermediate orifices situated in the distal intermediate plane;
the proximal, proximal intermediate, distal intermediate, and distal ducts are mutually aligned longitudinally;
the proximal, proximal intermediate, distal intermediate, and distal ducts, and the proximal, proximal intermediate, and distal orifices are angularly superposed in such manner that the sleeve can successively take up at least two of the following fluid-flow configurations:
a ninth fluid-flow configuration in which each of the proximal and intermediate distal ducts is closed, and each of the intermediate proximal and distal ducts is open;
a tenth fluid-flow configuration in which each of the proximal and intermediate distal ducts is open, and each of the intermediate proximal and distal ducts is closed;
an eleventh fluid-flow configuration in which each of the proximal and distal ducts is open, and each of the intermediate proximal and intermediate distal ducts is closed;
a twelfth fluid-flow configuration in which each of the proximal and distal ducts is closed, and each of the intermediate proximal and intermediate distal ducts is open;
a thirteenth fluid-flow configuration in which each of the proximal, intermediate proximal, and distal ducts is open, and the intermediate distal duct is closed;
a fourteenth fluid-flow configuration in which each of the proximal, intermediate distal, and distal ducts is open, and the intermediate proximal duct is closed;
a fifteenth fluid-flow configuration in which each of the proximal, intermediate proximal, and intermediate distal ducts is open, and the distal duct is closed; and
a sixteenth fluid-flow configuration in which each of the proximal, intermediate proximal, intermediate distal, and distal ducts is open.

The invention also provides a reciprocating and rotary pumping device for fluid, said reciprocating and rotary pumping device being characterized in that it includes drive means, a reciprocating and rotary subassembly for pumping a fluid as described, and removable mechanical coupling means for mechanically coupling the drive means to said piston in disassemblable manner.

The reciprocating and rotary pumping device may include a reciprocating and rotary subassembly having its sleeve provided with drive shapes designed to be coupled to adjustment means, and adjustment means suitable for urging the drive shapes to change the position of the sleeve relative to the body.

BRIEF DESCRIPTION OF THE DRAWINGS

The present invention can be better understood and other advantages appear on reading the following detailed description of embodiments given by way of non-limiting example and with reference to the accompanying drawings, in which:

FIGS. 3, 3A, & 3B, and FIGS. 4, 4A, & 4B are similar to FIGS. 2, 2A, & 2B, with the sleeve shown respectively in a second fluid-flow configuration and in a third fluid-flow configuration, the piston not being shown;

FIG. 28 is an axial section view of a portion of the reciprocating and rotary subassembly of FIG. 25, the sleeve being shown in the second fluid-flow configuration, and the piston not being shown;

FIGS. 28A and 28B are radial section views on respective ones of the section planes PP and DD of FIG. 28, the sleeve being shown in its second fluid-flow configuration, and the piston not being shown;

FIGS. 29, 29A, and 29B to FIGS. 33, 33A, and 33B are similar to FIGS. 28, 28A, and 28B, the sleeve being shown respectively in the third, the first, the eighth, the sixth, and the seventh fluid-flow configuration;

FIG. 45 is an axial section view of a portion of the reciprocating and rotary subassembly of FIG. 42, the sleeve being shown in the ninth fluid-flow configuration, and the piston not being shown;

FIGS. 45A, 45B, 45C and 45D are radial section views on respective ones of the section planes PP, RR, SS, and DD of FIG. 45, the sleeve being shown in its ninth fluid-flow configuration;

FIGS. 46, 46A, 46B, 46C, and 46D to FIGS. 53, 53A, 53B, 53C, and 53D are similar to FIGS. 45, 45A, 45B, 45C, and 45D, the sleeve being shown in respective ones of tenth to seventeenth fluid-flow configurations.

To make the drawings clearer, the sleeve is shown blackened in the various radial section views. In addition, like elements are given like reference numerals in the figures.

DESCRIPTION OF EMBODIMENTS

With reference to FIGS. 1 to 10, the reciprocating and rotary subassembly 1 of the invention has a first arrangement of a body 2, a first arrangement of a sleeve 3, and a first embodiment of a piston 4.

Figure 1:
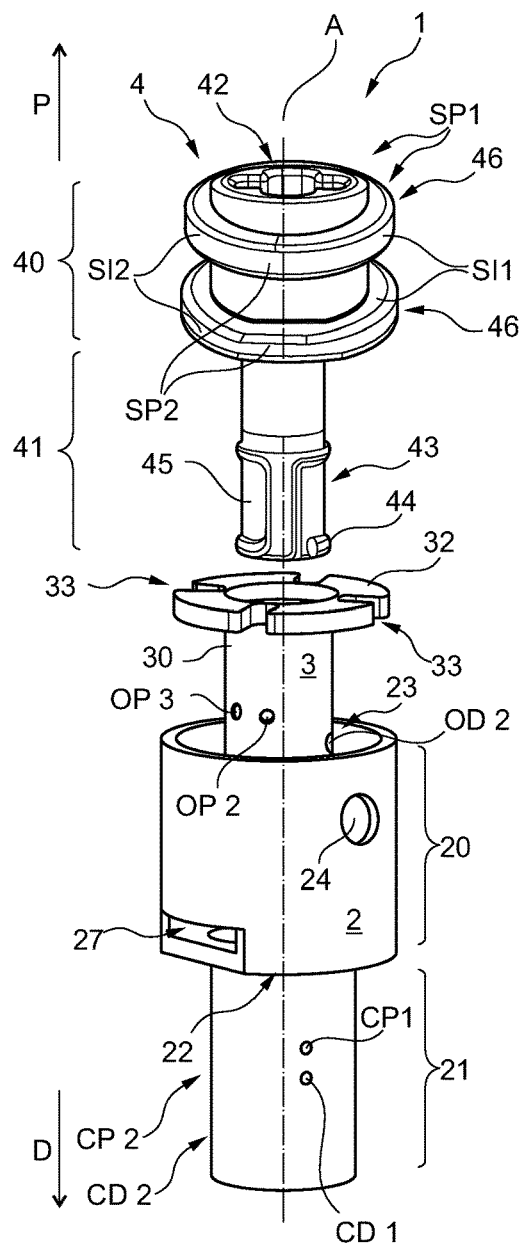
FIG. 1 is a perspective view of the reciprocating and rotary subassembly of the invention with a first arrangement of a body, a first embodiment of a piston, and a first arrangement of a sleeve, the body, the piston, and the sleeve being shown in the process of being assembled together.

The body 2 is hollow and is made up of two cylindrical portions 20, 21 shown in FIG. 1, that are of different diameters and that are interconnected by a shoulder 22. For example, the body 2 is made of a plastics material, or of any other suitable material. The inside of the large-diameter cylindrical portion 20 forms a bore 23 of longitudinal axis A. The free end of this large-diameter cylindrical portion 20 is open and is designed to receive, in longitudinal engagement, the sleeve 3 and the piston 4. The other end of the large-diameter cylindrical portion 20 is connected to the small-diameter cylindrical portion 21 via the shoulder 22. The wall of the large-diameter cylindrical portion 20 is provided with a hole 24 designed to receive a radial guide finger (not shown) disposed in such a manner as to extend into the bore 23. The guide finger, e.g. a pin, may be of cylindrical section or of any other suitable section. In addition, at the shoulder 22, the small-diameter cylindrical portion 21 is provided with a through slot 27 that can be seen in FIGS. 1 and 2, making it possible to access the inside of the bore, and having a function that is explained below.

Figure 2:
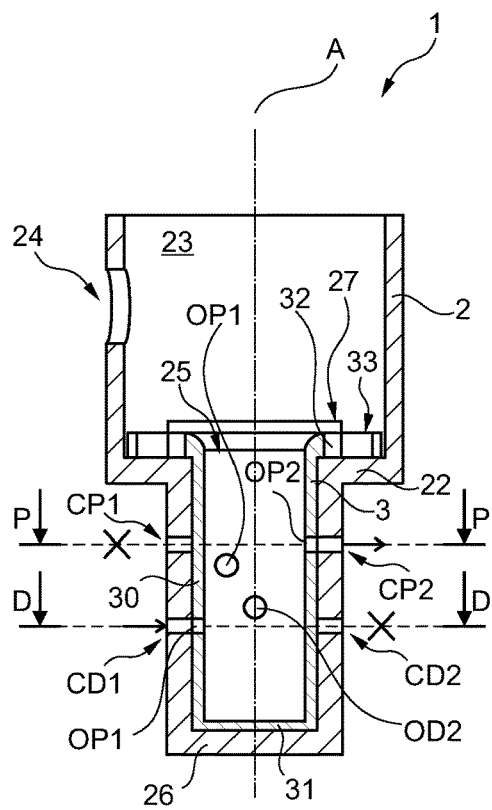
FIG. 2 is an axial section view of a portion of the reciprocating and rotary subassembly of FIG. 1, the sleeve being shown in a first fluid-flow configuration.

The inside of the small-diameter cylindrical portion 21 defines a cavity 25 that can be seen in FIG. 2, of longitudinal axis A and of diameter less than the diameter of the bore 23. The free end of the small-diameter cylindrical portion 21 is closed by an end-wall 26 that can be seen in FIG. 2. The bore 23 and the cavity 25 are designed to receive the sleeve 3 housed in the body 2, and the piston 4 housed in the sleeve 3. The body 2 thus co-operates with the piston 4 and via the sleeve 3 to define a working chamber 5 designed to receive fluid to be transferred. Two pairs of ducts CP1, CP2, CD1, and CD2 pass through the wall of the small-diameter cylindrical portion 21, these ducts opening out radially into the cavity 25, being, for example, of circular section, and being of the same diameter. In each pair, the two ducts CP1 & CP2, and CD1 & CD2 share a common axis, and are mutually diametrically opposite, one pair being situated in a proximal plane PP and the other in a distal plane DD, which planes are perpendicular to the longitudinal axis A. By convention, to distinguish between the ducts, and with reference to FIGS. 1 to 10, the proximal ducts that have their common axis situated in the proximal plane PP are referred to as the "first and second proximal" ducts CP1 & CP2, and the distal ducts that have their common axis situated in the distal radial plane DD are referred to as the "first and second distal" ducts CD1 & CD2. Each of the ducts may be used either for admission or for delivery depending on the direction of movement of the piston 4 in the body 2 described below. The ducts may be also be disposed in any other suitable configuration. They may also be equipped with end-pieces enabling them to be put into fluid connection, e.g. via an admission pipe or via a delivery pipe.

With reference, in particular, to FIG. 1, the first arrangement of the sleeve 3 is formed by an annular portion 30, one end of which is closed off by an end wall 31 and the other end of which is provided with a flange 32. The sleeve 3 is dimensioned to match the inside shapes of the body 2, the flange 32 resting on the inside face of the shoulder 22, and the end wall 31 of the sleeve 3 resting on the end wall 26 of the body 2. The sleeve 3 is coaxial with the body 2, relative to which it can turn without moving longitudinally. To this end, the end wall 32 is provided with drive shapes 33 suitable for being urged by adjustment means for changing the angular position of the sleeve 3 relative to the body 2. To this end, the adjustment means pass through the slot 27. The wall of the annular portion 30 is provided with a plurality of through orifices disposed in the same radial planes, i.e. in the proximal plane PP or in the distal plane DD, as the proximal ducts CP1 & CP2 and distal ducts CD1 & CD2, each orifice being designed to be individually facing or not facing a respective one of the ducts. When an orifice OP1, OP2, OP3, OD1, OD2, OD3 is facing a duct CP1, CP2, CD1, CD2, it allows fluid to pass from the duct CP1, CP2, CD1, CD2 to the cavity 25. When no orifice OP1, OP2, OP3, OD1, OD2, OD3 is facing a given duct CP1, CP2, CD1, CD2, that duct CP1, CP2, CD1, CD2 is then closed off and fluid cannot flow through the duct CP1, CP2, CD1, CD2 to the cavity 25. In the example shown, the sleeve 3 has first, second, and third proximal orifices OP1, OP2, OP3 that are angularly distributed in the proximal radial plane PP, and first, second, and third distal orifices OD1, OD2, OD3 that are angularly distributed in the distal radial plane DD. As shown in FIGS. 2A to 4A, the second proximal orifice OP2 is offset by 135° clockwise relative to the first proximal orifice OP1. The third proximal orifice OP3 is offset by 45° clockwise relative to the second proximal orifice OP2. As shown in FIGS. 2B to 4B, the second distal orifice OD2 is offset by 90° clockwise relative to the first distal orifice OD1. The third distal orifice OD3 is offset by 180° clockwise relative to the second distal orifice OD2. In addition, the first distal orifice OD1 is offset by 45° counterclockwise relative to the first proximal orifice OP1. The orifices may be disposed in any other suitable manner. The possible fluid-flow configurations depend on the respective angular positions of the orifices and on the respective angular positions of the ducts.

Thus, for a body provided with four ducts, the first to eight possible fluid-flow configurations are shown in FIGS. 34 to 41. In those figures, the sleeve 3 is shown diagrammatically by a fine dot-dash line, each non fluid-flow communication is shown diagrammatically by a cross, and each fluid-flow communication is shown diagrammatically by a double-headed arrow. In each of these fluid-flow configurations, at least one of the orifices is used for admission, and at least one other is used for delivery.

Figure 34:
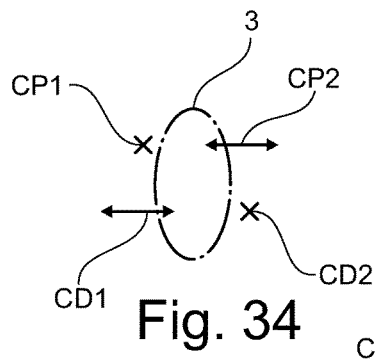
FIGS. 34 to 41 are diagrams showing from the first to the seventh fluid-flow configurations of a reciprocating and rotary dispenser of the invention with four ports, these diagrams being used by way of convention for distinguishing between the various fluid-flow configurations.

With reference to FIG. 34, in the first fluid-flow configuration, the first proximal duct CP1 and the second distal duct CD2 are closed, i.e. the sleeve 3 closes them off relative to fluid flow, and the first distal duct CD1 and the second proximal duct CP2 are open, i.e. proximal and distal orifices in the sleeve 3 are facing them so as to allow fluid-flow communication with the cavity 25. Thus, in the first fluid-flow configuration, the fluid can be admitted via the first distal duct CD1 and delivered via the second proximal duct CP2, or vice versa. In a symmetrical first fluid-flow configuration (not shown), the second proximal duct CP2 and the first distal duct CD1 are closed, and the first proximal duct CP1 and the second distal duct CD2 are open. Thus, in the first symmetrical fluid-flow configuration, the fluid can be admitted via the second distal duct CD2 and delivered via the first proximal duct CP1, or vice versa.

Figure 35:
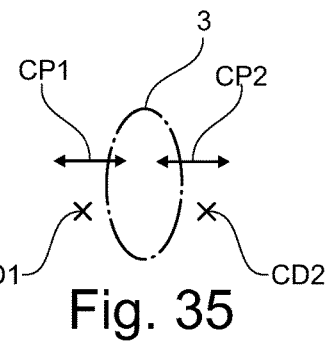

With reference to FIG. 35, in the second fluid-flow configuration, the first and second proximal ducts CP1, CP2 are open, and the first and second distal ducts CD1, CD2 are closed. Thus, in the second fluid-flow configuration, the fluid can be admitted via the first proximal duct CP1 and delivered via the second proximal duct CP2, or vice versa.

Figure 36:
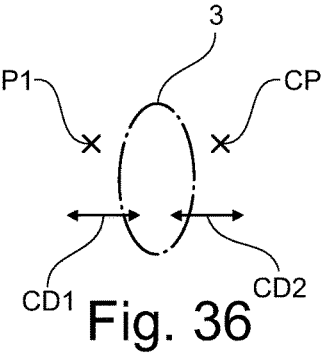

With reference to FIG. 36, in the third fluid-flow configuration, the first and second proximal ducts CP1, CP2 are open, and the first and second distal ducts CD1, CD2 are closed. Thus, in the third fluid-flow configuration, the fluid can be admitted via the first distal duct CD1 and delivered via the second distal duct CD2, or vice versa.

Figure 37:
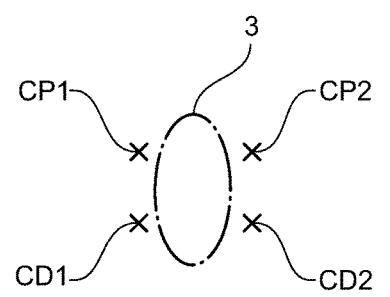

With reference to FIG. 37, in the fourth fluid-flow configuration, the first and second proximal ducts CP1, CP2, and the first and second distal ducts CD1, CD2 are all closed. Thus, in the fourth fluid-flow configuration, the fluid can neither be admitted nor delivered. The first and second proximal ducts CP1, CP2 and the first and second distal ducts CD1, CD2 are thus isolated from the working chamber 5.

Figure 38:
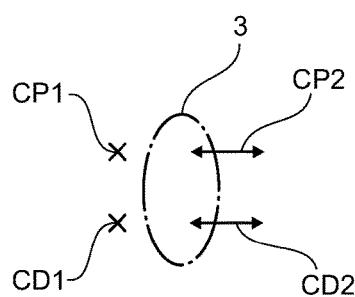

With reference to FIG. 38, in the fifth fluid-flow configuration, the first proximal duct CP1, and the first distal duct CD1 are closed, and the second proximal duct CP2, and the second distal duct CD2 are open. Thus, in the fifth fluid-flow configuration, the fluid can be admitted via the second proximal duct CP2 and delivered via the second distal duct CD2, or vice versa.

Figure 39:
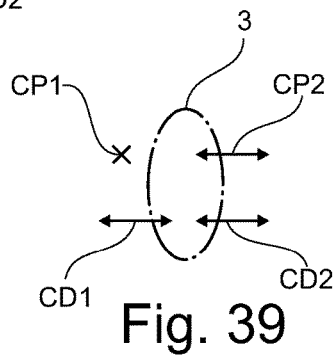

With reference to FIG. 39, in the sixth fluid-flow configuration, the first proximal duct CP1 is closed, and the second proximal duct CP2 and the first and second distal ducts CD1, CD2 are open. Thus, in the first fluid-flow configuration, the fluid can be admitted via the first distal duct CD1 and delivered via the second proximal and distal ducts CP2, CD2, or vice versa. In a symmetrical sixth fluid-flow configuration (not shown), the second proximal duct CP2 is closed, and the first proximal duct CP1 and the first and second distal ducts CD1, CD2 are open. Thus, in the symmetrical sixth fluid-flow configuration, the fluid can be admitted via the second distal duct CD2 and delivered via the first proximal and distal ducts CP1, CD1, or vice versa.

Figure 40:
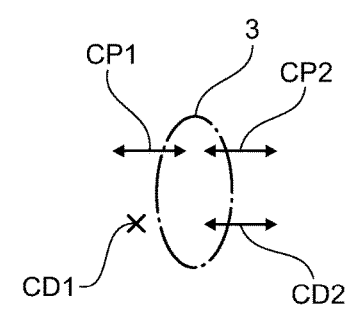

With reference to FIG. 40, in the seventh fluid-flow configuration, the first and second proximal ducts CP1, CP2 and the second distal duct CD2 are open, and the first distal duct CD1 is closed. Thus, in the seventh fluid-flow configuration, the fluid can be admitted via the first proximal duct CP1 and delivered via the second proximal and distal ducts CP2, CD2, or vice versa. In a symmetrical seventh fluid-flow configuration (not shown), the first and second proximal ducts CP1, CP2 and the first distal duct CD1 are open, and the second distal duct CD2 is closed. Thus, in the symmetrical seventh fluid-flow configuration, the fluid can be admitted via the first proximal and distal ducts CP1, CD1, and delivered via the second proximal duct CP2, or vice versa.

Figure 41:
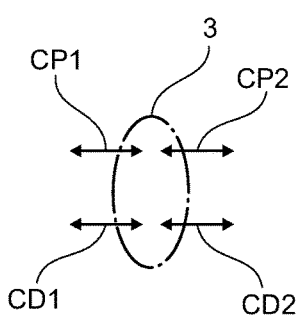

With reference to FIG. 41, in the eighth fluid-flow configuration, the first and second proximal ducts CP1, CP2, and the first and second distal ducts CD1, CD2 are all open. Thus, in the eight fluid-flow configuration, the fluid can be admitted via the first proximal and distal ducts CP1, CD1, and delivered via the second proximal and distal ducts CP2, CD2, or vice versa.

As described in detail below, the first arrangement of the body 2 and the first arrangement of the sleeve 3 make several fluid-flow configurations possible, three of which are shown and described in detail below with reference to FIGS. 2 to 4B. In those figures, an arrow pointing towards the body 2 corresponds to admission, and an arrow pointing in the opposite direction corresponds to delivery. Depending on the direction of movement of the piston 4 in the body 2, admission and delivery can be reversed, the direction of the arrows then also being reversed.

Figure 2A:
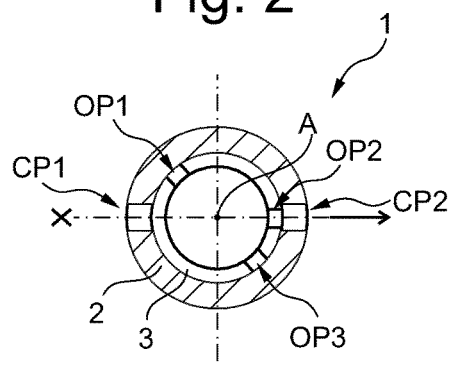
FIGS. 2A and 2B are radial section views on respective ones of the section planes PP and DD of FIG. 2, the sleeve being shown in its first fluid-flow configuration.
Figure 2B:
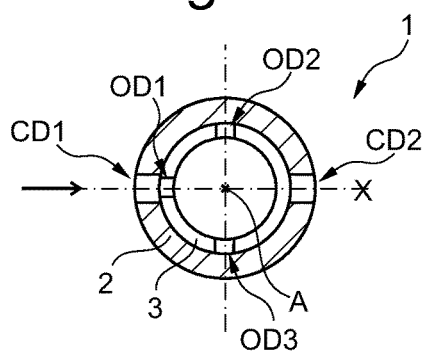

With reference to FIGS. 2, 2A, and 2B, the sleeve 3 is in the first fluid-flow configuration (cf. FIG. 34), in which the first proximal duct CP1 is closed off by the sleeve 3, the second distal orifice OP2 is facing the second proximal duct CP2, the first distal orifice OD1 is facing the first distal duct CD1, and the second distal duct CD2 is closed off by the sleeve 3.

With reference to FIGS. 3, 3A, and 3B, the sleeve 3 is in the second fluid-flow configuration (cf. FIG. 35), in which the first and third proximal orifices OP1, OP3 are facing respective ones of the first and second proximal ducts CP1, CP2, and the first and second distal ducts CD1, CD2 are closed off by the sleeve 3. To go from the first fluid-flow configuration to the second fluid-flow configuration, the sleeve 3 has been turned through an angle α of 45° relative to the body counterclockwise as seen observing in a distal direction.

With reference to FIGS. 4, 4A, and 4B, the sleeve 3 is in the third fluid-flow configuration (cf. FIG. 36), in which the first and second proximal ducts CP1, CP2 are closed off by the sleeve 3, the second distal orifice OD2 is facing the first distal duct CD1 and the third distal orifice OD3 is facing the second distal duct CD2. To go from the second fluid-flow configuration to the third fluid-flow configuration, the sleeve 3 has been turned through an angle α of 45° relative to the body counterclockwise as seen observing in a distal direction.

Beyond this third fluid-flow configuration, the sleeve 3 may be turned to take up other fluid-flow configurations not described in detail.

With reference to FIG. 1, the first embodiment of the piston 4 is made up of two cylindrical portions 40, 41 that are of different diameters and that are interconnected by a shoulder (not described in detail). For example, the piston 4 is made of a plastics material, or of any other suitable material. The large-diameter cylindrical portion 40 of the piston 4 has an outside diameter slightly less than the diameter of the cavity 25 in which it can thus be received. The small-diameter cylindrical portion 41 of the piston 4 has an outside diameter slightly less than the diameter of the sleeve 3 in which it can thus be received. The free end of the small-diameter cylindrical portion 41 co-operates with the end wall of the body 2 to define a working chamber 5 (shown in FIGS. 6 to 10) designed to receive the fluid. In addition, the free end of the large-diameter cylindrical portion 40 has an axial recess 42 that can be seen in FIG. 1, that is, for example, cross-shaped, and that is suitable for receiving an end-piece (not shown) of complementary shape coupled to drive means designed to cause the piston 4 to turn relative to the body 2.

In its periphery, the piston 4 is provided with a recess 43. In this embodiment, the recess 43 is in the shape of a groove extending longitudinally between a closed end pointing towards the large-diameter cylindrical portion 40 and an open end opening out into the working chamber 5. The recess 43 extends over a length enabling it, each time the piston 4 turns through one half-turn in the body 2, to be facing, in succession, the first distal and proximal ducts CD1, CP1 and the second distal and proximal ducts CD2, CP2. In the example shown, the recess 43 is provided with a balancing lug 44 (shown in FIG. 1) provided at its open end and extending radially so that its outermost tip presses against the sleeve 3, while allowing fluid to pass on either side of it.

In its periphery, the piston 4 is also provided with a recessed zone 45 (visible in FIG. 1) that is closed, and that is angularly opposite from the recess 43. The recessed zone 45 and the recess 43 are delimited by sealing gaskets (not shown), e.g. made of elastomer, and making it possible to avoid any flow of fluid outside the recess 43 and outside the working chamber 5.

The large-diameter cylindrical portion 40 of the piston 4 is provided with two annular ribs 46 that are parallel to each other so as to define between them a double cam for guiding the guide finger. Thus, the longitudinal spacing between the annular ribs 46, at any point of the rotation in register with the guide finger, fits the dimensions of the guide finger so as to allow the guiding to take place without clearance or without excessive clearance. The guide finger may also be provided with a rotary portion designed to roll along the annular ribs 46, thereby reducing friction. The energy efficiency is thus optimized. The guide finger and the annular ribs 46 make it possible to transform the movement in rotation of the piston 4 relative to the body 2 into movement in longitudinal translation along the longitudinal axis A.

Each of the ribs 46 is provided with first and second inclined portions SI1, SI2 that are mutually symmetrical about a longitudinal midplane. The first and second inclined portions SI1, SI2 thus have slopes that are inverted over the periphery of the piston 4. The first and second inclined portion SI1, SI2 are separated from each other by first and second plane portions SP1, SP2 that are substantially mutually parallel and perpendicular to the longitudinal axis A. Thus, via the guide finger and the and the annular ribs 46, the piston 4 moving in rotation in a first rotation direction R relative to the body 2, successively causes the piston 4 not to move axially relative to the body 2, going along the first plane portion SP1 (cf. FIG. 5), then causes the piston 4 to move in proximal translation TP relative to the body 2, going along the first inclined portion SI1 (cf. FIGS. 6 and 7), then causes the piston 4 not to move axially relative to the body 2, going along the second plane portion SP2 (cf. FIG. 8), and then finally causes the piston 4 to move in distal translation (TD) relative to the body 2, going along the second inclined portion SI2 (cf. FIGS. 9 and 10), and so on. The piston 4 thus moves in reciprocating manner between a proximal position (cf. FIG. 8) in which the working chamber 5 has maximum volume and a distal position (cf. FIG. 5) in which the working chamber 5 has minimum volume. Between these two positions of the piston 4, the working chamber 5 admits and then delivers the fluid.

With reference to FIGS. 5 to 10, operation of the reciprocating and rotary subassembly 1 of the invention is described below, for the third fluid-flow configuration (cf. FIGS. 4, 4A, 4B, and 36) in which the second distal orifice OD2 is facing the first distal duct CD1 and the third distal orifice OD3 is facing the second distal duct CD2.

Figure 5:
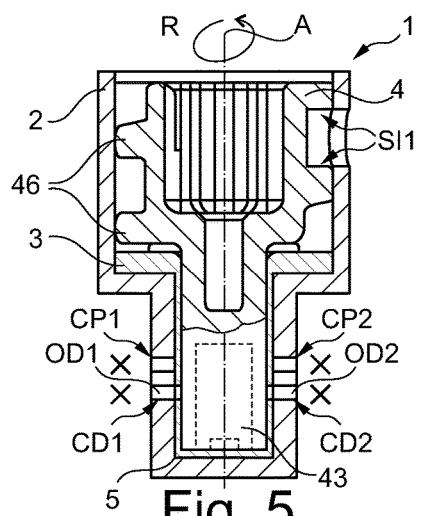
FIGS. 5 to 10 are axial section views of the reciprocating and rotary subassembly of FIG. 4, with the sleeve in the third fluid-flow configuration, the first embodiment of the piston being shown in six distinct operating positions of a pumping cycle.

In a first switch-over stage shown in FIG. 5, the guide finger travels along the first plane portion SP1 of the cam. The piston 4 moving in rotation R then does not cause it to move in translation, and it remains axially stationary in its distal position, with the volume of the working chamber 5 not varying and remaining at its minimum. During this first switch-over stage, the first distal duct CD1 and the second distal duct CD2 are facing the uninterrupted portion of the piston 4. Thus, even if the first and second distal orifices OD1, OD2 are facing respective ones of the first and second distal ducts CD1, CD2, the working chamber 5 is closed to fluid flow in leaktight manner. The piston 4 moving in rotation R relative to the body 2 continues until the admission stage is reached.

Figure 6:
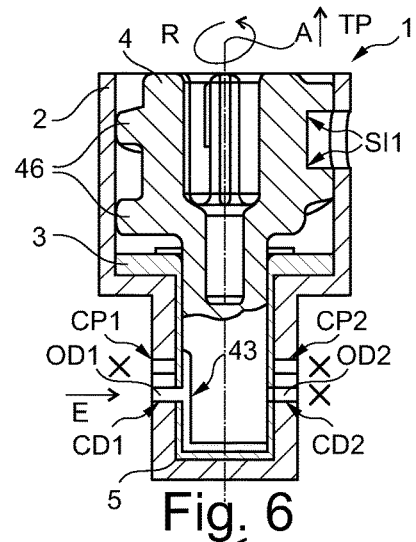
Figure 7:
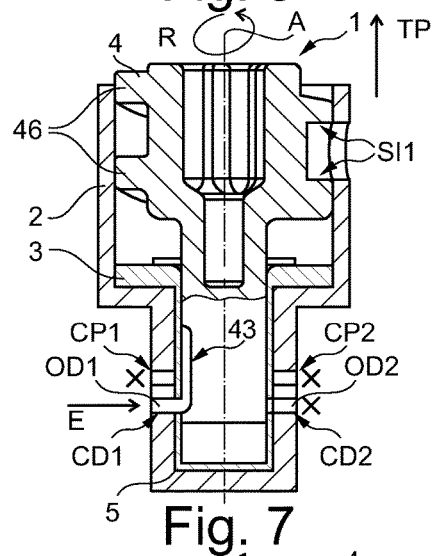

In the admission stage, shown by FIGS. 6 and 7, the guide finger travels mainly along the first inclined portion SI1 of the cam that transforms the movement in rotation R of the piston 4 into a movement in proximal translation TP of the piston 4 relative to the body 2. The piston 4 goes from the distal position (FIG. 5) to a proximal position (FIG. 8) in which the working chamber 5 has maximum volume. During the admission stage, the piston 4 turns relative to the body 2 with the recess 43 traveling past the first distal duct CD1 and past the first proximal duct CP1. Thus, the first duct CD1 is in fluid-flow communication with the working chamber 5 via the second distal orifice OD2 and via the recess 43. The fluid is sucked in as indicated by arrow E, by means of the increase in the volume of the working chamber 5 caused by the movement in proximal translation TP and by the suction generated in the working chamber 5. The first proximal duct CP1 and the second proximal duct CP2 remain closed off by the sleeve 3. During the admission stage, the leaktightness of the recessed zone 45 is guaranteed by the sealing gasket, and the second distal duct CD2 is not in fluid-flow communication with the working chamber 5, as shown diagrammatically by a cross. The piston 4 moving in rotation R relative to the body 2 continues until a second switch-over stage is reached. In advantageous manner, at the beginning of the admission stage, during a transition stage, the guide finger travels over the end of the second plane portion SP2. Similarly, at the end of the admission stage, during a transition stage, the guide finger travels over the start of the first plane portion SP1 of the cam. Thus, the transition phases take place with the working chamber 5 at a constant volume.

Figure 8:
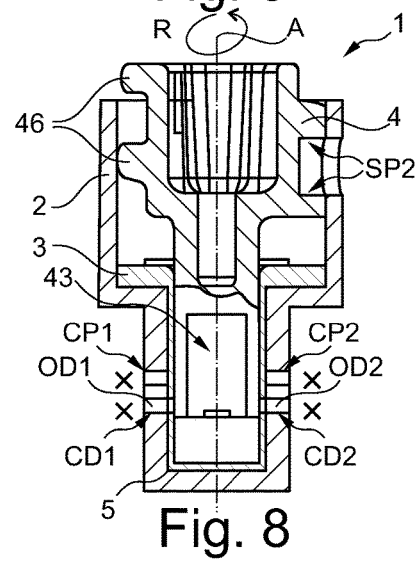

The second switch-over stage shown by FIG. 8 is substantially similar to the first switch-over stage. It differs from it by the piston 4 being in the proximal position and by the working chamber 5 having maximum volume. During this second switch-over stage, the guide finger travels along the second plane portion SP2 of the cam. The piston 4 moving in rotation R then does not cause it to move in translation, and it remains axially stationary in its distal position, with the volume of the working chamber 5 not varying and remaining at its maximum. During this second switch-over stage, the first distal duct CD1 and the second distal duct CD2 are facing the uninterrupted portion of the piston 4. Thus, even if the first and second distal orifices OD1, OD2 are facing respective ones of the first and second distal ducts CD1, CD2, the working chamber 5 is closed to fluid flow in leaktight manner. The piston 4 moving in rotation R relative to the body 2 continues until the delivery stage is reached.

Figure 9:
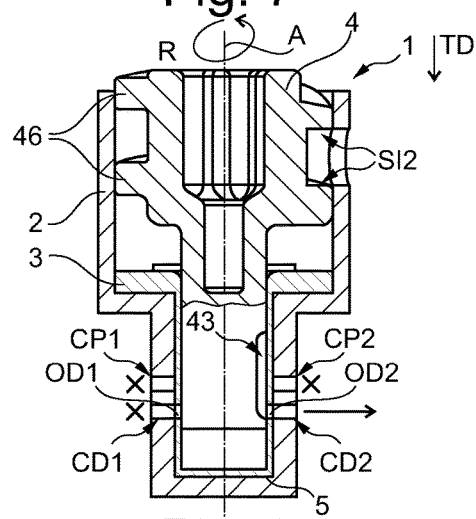
Figure 10:
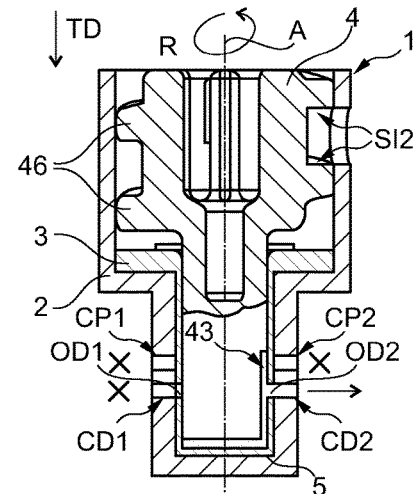
Figure 11:
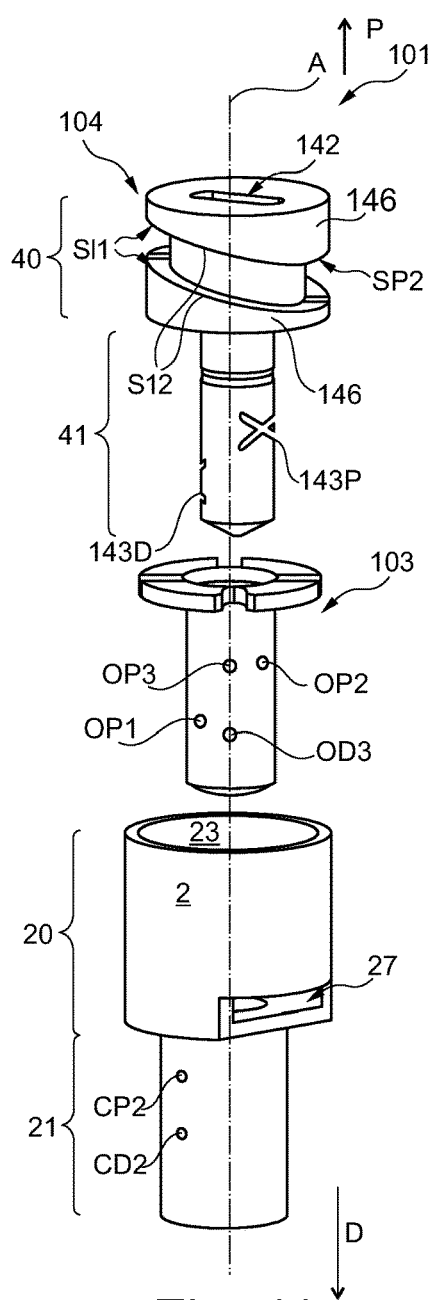
FIG. 11 is a perspective view of the reciprocating and rotary subassembly of the invention with the first arrangement of the body, a second embodiment of the piston, and a second arrangement of the sleeve, the body, the piston, and the sleeve being shown in the process of being assembled together.

In this delivery stage, shown by FIGS. 9 and 10, the guide finger travels mainly along the second inclined portion SI2 of the cam that transforms the movement in rotation R of the piston 4 into a movement in distal translation TD of the piston 4, opposite from the movement in proximal translation TP. Thus, the piston 4 goes from its proximal position (FIG. 8) to its distal position (FIG. 5). During the delivery stage, the piston 4 turns relative to the body 2 with the recess 43 traveling past the second distal duct CD2 and past the second proximal duct CP2. Thus, the second distal duct CD2 is in fluid-flow communication with the working chamber 5 via the second distal orifice OD2 and via the recess 43. The fluid is delivered as indicated by the arrow S, by means of the reduction in volume of the working chamber 5 that is caused by the movement in distal translation TD and creating extra pressure in the working chamber 5. During this delivery stage, the leaktightness of the recessed zone 45 is guaranteed by the sealing gasket, and the first distal duct CD1 is not in fluid-flow communication with the working chamber 5. The piston 4 moving in rotation R relative to the body 2 continues until the above-described first switch-over stage is reached. In advantageous manner, at the beginning of delivery, during a transition stage, the guide finger travels over the end of the first plane portion SP1. Similarly, at the end of the delivery stage, during a transition stage, the guide finger travels over the start of the second plane portion SP2 of the cam. Thus, the transition phases take place with the working chamber 5 at a constant volume.

With reference to FIGS. 11 to 21, the reciprocating and rotary subassembly 101 of the invention has the first arrangement of a body 2, a second arrangement of the sleeve 103, and a second embodiment of the piston 104.

The second embodiment of the piston 104 is substantially similar to the first embodiment of the piston 4 and differs from it mainly in that the second embodiment of the piston is provided with a distal recess 143D and with a proximal recess 143P that are cross-shaped and that are provided in the periphery of the small-diameter cylindrical portion 41. The distal and proximal recesses 143D and 143P may have any other suitable shape. These distal and proximal recesses 143D and 143P are mutually offset angularly, in this example by 180°, and longitudinally by a distance depending, in particular, on the profile of the annular ribs 146, and organized so that, each time the piston 104 turns through one half-turn in the body 2, the proximal recess 143P is facing one of the first and second proximal ducts CP1, CP2, and the distal recess 143D is facing one of the first and second distal ducts CD1, CD2. The piston 104 is also provided with a channel 147 that can be seen in FIG. 13 and that is provided with a longitudinal segment opening out longitudinally into the working chamber 5, with a distal radial segment opening out into the distal recess 143D, and with a proximal radial segment opening out into the proximal recess 143P. In addition, the axial recess 142 provided at the free end of the large-diameter cylindrical portion 140 is in the shape of a rectilinear slot.

With reference, in particular, to FIGS. 14A & 14B, 15A & 15B, 16A & 16B, and 17A & 17B, the second arrangement of the sleeve 103 is substantially similar to the sleeve 3 of the first arrangement. It differs therefrom by the number and the locations of the orifices. The sleeve 103 has first, second, and third proximal orifices OP1, OP2, OP3 that are angularly distributed in the proximal radial plane PP, and first, second, and third distal orifices OD1, OD2, OD3 that are angularly distributed in the distal radial plane DD. As shown in FIGS. 14A to 17A, the second proximal orifice OP2 is offset by 180° clockwise relative to the first proximal orifice OP1. The third proximal orifice OP3 is offset by 45° clockwise relative to the second proximal orifice OP2. As shown in FIGS. 14B to 17B, the second distal orifice OD2 is offset by 180° clockwise relative to the first distal orifice OD1. The third distal orifice OD3 is offset by 135° clockwise relative to the second distal orifice OD2. In addition, the first distal orifice OD1 is offset by 90° counterclockwise relative to the first proximal orifice OP1.

The first arrangement of the body 2 and the second arrangement of the sleeve 103 make several fluid-flow configurations possible, some of which are shown and described in detail below.

Figure 14:
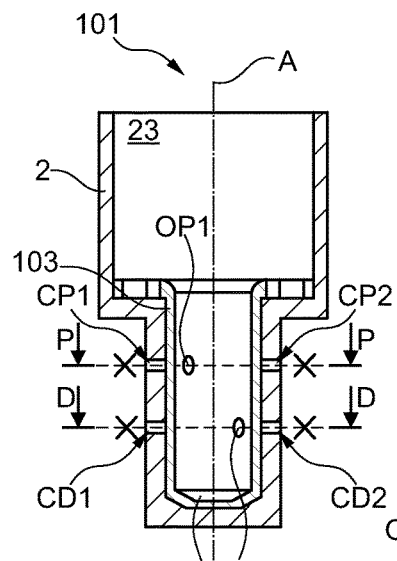
FIG. 14 is an axial section view of a portion of the reciprocating and rotary subassembly of FIG. 11, the sleeve being shown in a fourth fluid-flow configuration, and the piston not being shown.
Figure 14A:
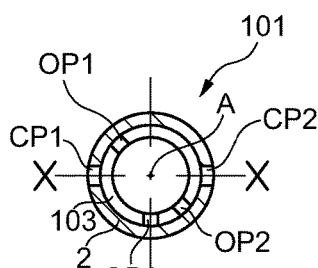
FIGS. 14A and 14B are radial section views on respective ones of the section planes PP and DD of FIG. 14, the sleeve being shown in its fourth fluid-flow configuration, and the piston not being shown.
Figure 14B:
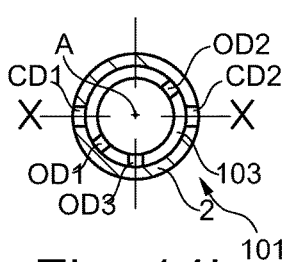

With reference to FIGS. 14, 14A, and 14B, the sleeve 103 is in the fourth fluid-flow configuration (cf. FIG. 37) in which the first and second distal ducts CD1, CD2 and the first and second proximal ducts CP1, CP2 are closed off by the sleeve 103.

Figure 15:
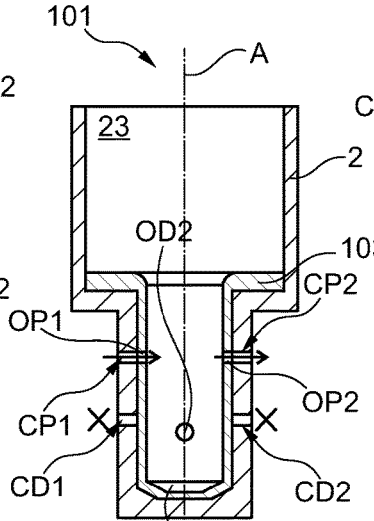
FIGS. 15, 15A, and 15B to FIGS. 17, 17A, and 17B are similar to FIGS. 14, 14A, and 14B, the sleeve being shown respectively in the second, a fifth, and the third fluid-flow configuration.
Figure 15A:
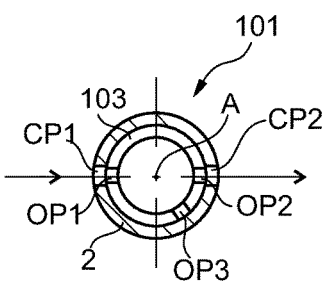
Figure 15B:
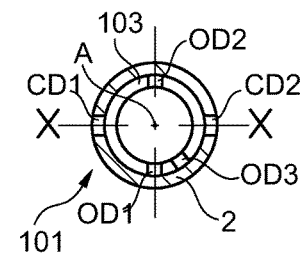

With reference to FIGS. 15, 15A, and 15B, the sleeve 103 is in the second fluid-flow configuration (cf. FIG. 35), in which the first and second proximal orifices OP1, OP2 are facing respective ones of the first and second proximal ducts CP1, CP2, and the first and second distal ducts CD1, CD2 are closed off by the sleeve 103. To go from the fourth fluid-flow configuration to the second fluid-flow configuration, the sleeve 103 has been turned through an angle α of 45° relative to the body 2 counterclockwise as seen observing in a distal direction.

Figure 16:
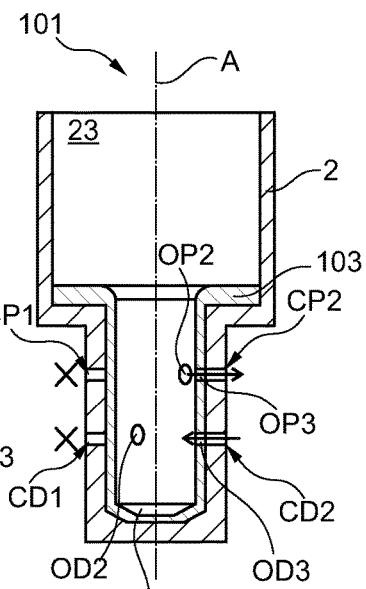
Figure 16A:
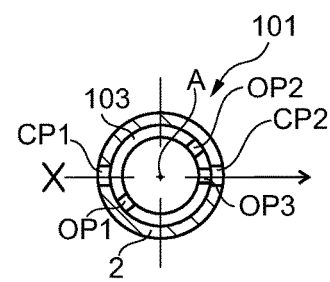
Figure 16B:
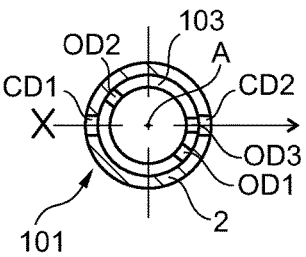

With reference to FIGS. 16, 16A, and 16B, the sleeve 103 is in the fifth fluid-flow configuration (cf. FIG. 38), in which the third proximal orifice OP3 is facing the second proximal duct CP2, the third distal orifice OD3 is facing the second distal duct CD2, and the first proximal duct CP1 and the first distal duct CD1 are closed off by the sleeve 103. To go from the second fluid-flow configuration to the fifth fluid-flow configuration, the sleeve 103 has been turned through an angle α of 45° relative to the body counterclockwise as seen observing in a distal direction.

Figure 12:
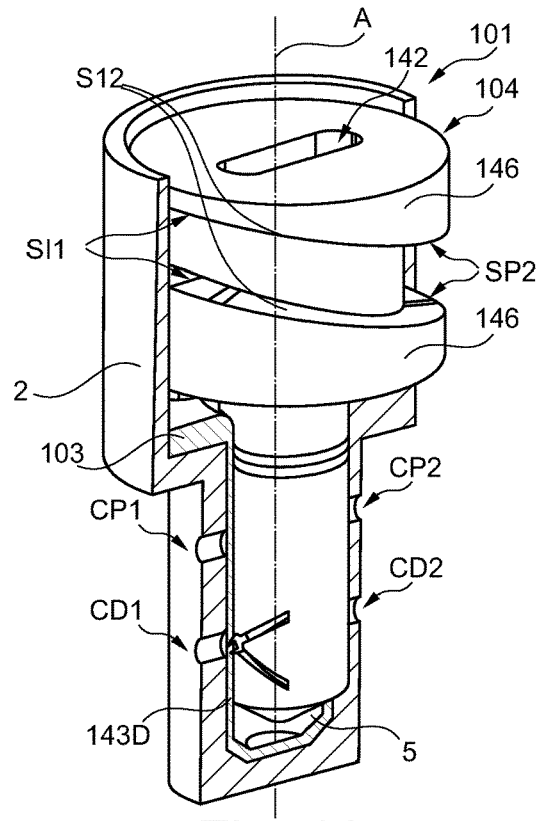
FIGS. 12 and 13 are respectively a partially cutaway perspective view and an axial section view of the reciprocating and rotary subassembly of FIG. 11, the sleeve being shown in the third fluid-flow configuration.
Figure 13:
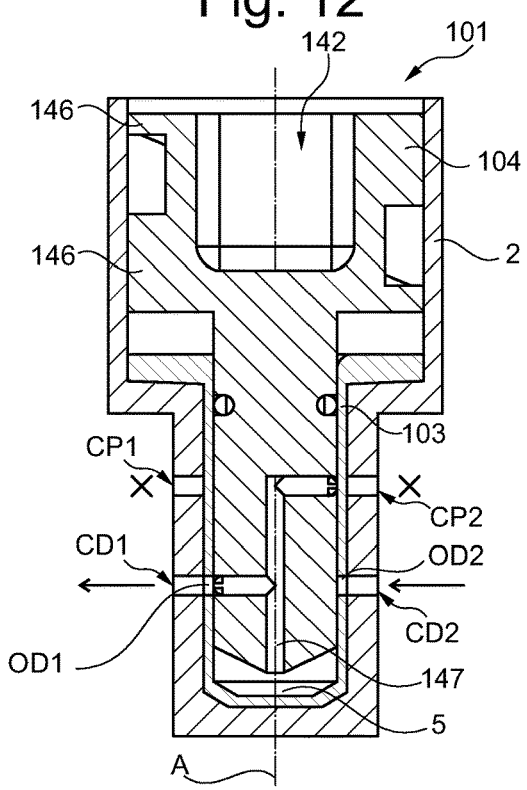
Figure 17:
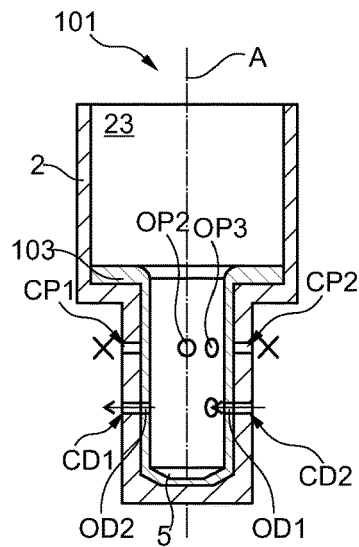
Figure 17A:
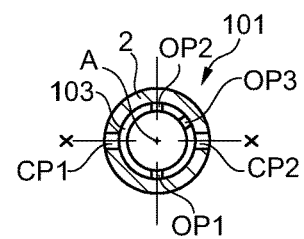
Figure 17B:
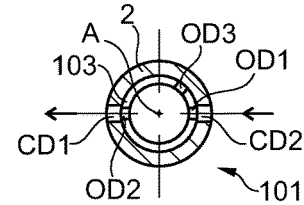

With reference to FIGS. 17, 17A, and 17B, and to FIGS. 12 and 13, the sleeve 103 is in the third fluid-flow configuration (cf. FIG. 36), in which the first and second distal orifices OD1, OD2 are facing respective ones of the second and first distal ducts CD2, CD1, and the first and second proximal ducts CP1, CP2 are closed off by the sleeve 103. To go from the fifth fluid-flow configuration to the third fluid-flow configuration, the sleeve 103 has been turned through an angle α of 45° relative to the body 2 counter-clockwise as seen observing in a distal direction. Beyond this third fluid-flow configuration, the sleeve 103 may be turned to take up other fluid-flow configurations not described in detail.

With reference to FIGS. 18 to 21, such a reciprocating and rotary device 101 may, for example, be used to reconstitute a mixture based, for example, on a liquid solution and on a lyophilisate that are contained separately in two distinct bottles 6, 7, and then to administer the resulting mixture to a patient or to keep it in one of the bottles or in some other receptacle. To this end, with reference to FIG. 18, the first proximal duct CP1 is connected to a first bottle 6 containing a liquid solution, the second proximal and distal ducts CP2, CD2 are connected to a second bottle 7 containing a lyophilisate and the first distal duct CD1 is connected to an administration device 8, e.g. for administration by injection. These connections may be implemented by any suitable means, e.g. by pipes. In FIGS. 18 to 21, the pipes are shown in uninterrupted lines when the fluid is flowing inside them, and in dashed lines when no fluid is flowing inside them.

Before the fluid transfer, the sleeve 103 (shown diagrammatically as a fine dot-dash line) is kept in the fourth fluid-flow configuration (cf. FIGS. 14, 14A, 14B, and 37). Thus, in spite of the fluid-flow connection between the first and second bottles 6, 7, the liquid solution in the first bottle 6 remains, at this stage, separate from the lyophilisate stored in the second bottle 7, i.e. without any fluid flow between the solution and the lyophilisate.

Figure 19:
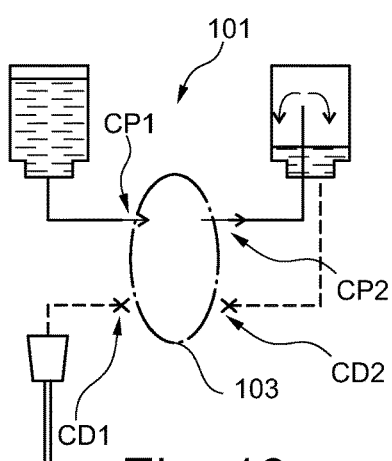
FIGS. 18 to 21 are diagrammatic views showing the steps involved in using the reciprocating and rotary subassembly of FIG. 11, with the sleeve successively in the fourth, the second, the fifth, and the third fluid-flow configuration.
Figure 18:
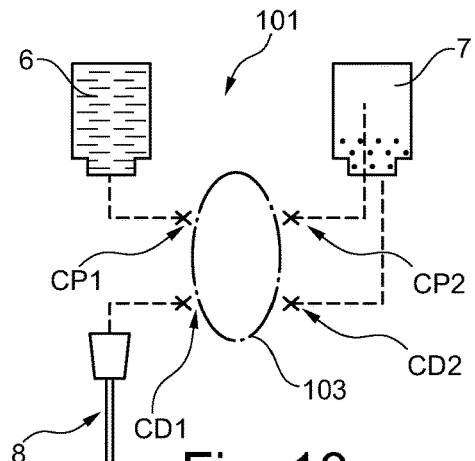

In a first stage, with reference to FIG. 19, the sleeve 103 is disposed in the second fluid-flow configuration (cf. FIGS. 15, 15A, 15B, and 35). The piston 104 is actuated so as to suck the liquid solution into the working chamber 5 via the first proximal duct CP1 and so as to deliver it from the working chamber 5 via the second proximal duct CP2 to the second bottle 7. The liquid solution is thus transferred from the first bottle 6 initially containing it to the second bottle 7 containing the lyophilisate. At this stage, the mixture of liquid solution and of lyophilisate may be homogenized by the mixture being caused to go back and forth between the first and second bottles 6, 7 by reversing the direction of rotation of the piston 104.

Figure 20:
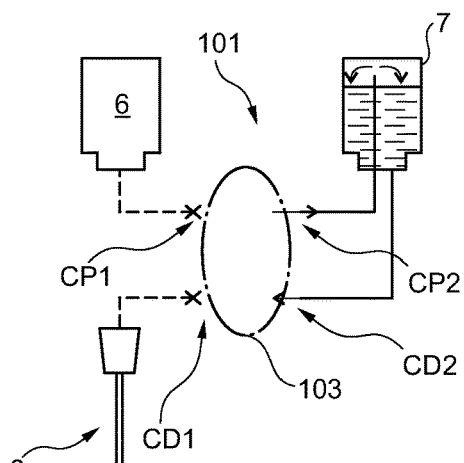

In a second stage, with reference to FIG. 20, the sleeve 103 is disposed in the fifth fluid-flow configuration (cf. FIGS. 16, 16A, & 16B, and 38). The piston 104 is actuated so as to suck the liquid solution and the lyophilisate from the second bottle 7 into the working chamber 5 via the second distal duct CD2 and so as to deliver it from the working chamber 5 to the second bottle 7 via the second proximal duct CP2. The flowing and mixing of the liquid solution and of the lyophilisate makes it possible to obtain a homogeneous mixture in the second bottle 7.

Figure 21:
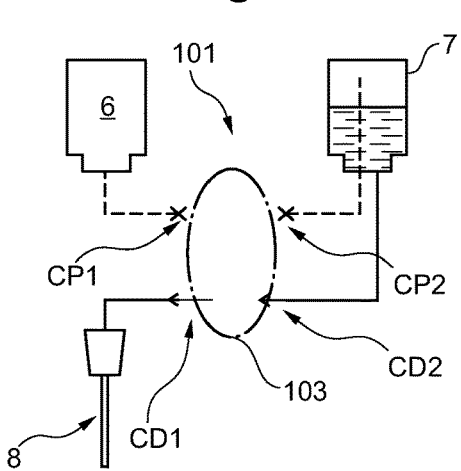

In a third stage, with reference to FIG. 21, the sleeve 103 is disposed in the third fluid-flow configuration (cf. FIGS. 17, 17A, & 17B, and 36). The piston 104 is actuated so as to suck the mixture contained in the second bottle 7 into the working chamber 5 via the second distal duct CD2 and so as to deliver it from the working chamber 5 via the first distal duct CD1 to the administration device 8.

In another mode of use, not shown, a fraction of the mixture may be stored in the first bottle 6, another fraction of the mixture being contained in the second bottle 7 to be transferred to the administration device 8. The fraction of the mixture that is stored in the first bottle 6 can then be transferred to the second bottle 7, and then to the administration device 8. The administration can thus be sequenced over time. By adapting the proportion of mixture in the first and second bottles 6, 7, the sequencing may be broken down into a higher number of sequences, the administered volume at each sequence being adapted to suit needs.

As a function of the fluid-flow connections and of the fluid-flow configurations used for the sleeve 103, the reciprocating and rotary device 101 of FIGS. 11 to 17B may be used for any other application.

It can easily be understood that changing the sleeve makes it possible to use other fluid-flow configurations. This applies, in particular to the third arrangement of the sleeve 203 shown in FIGS. 22 to 24B and used with the first arrangement of the body 2 and with the second embodiment of the piston 104.

The third arrangement of the sleeve 203 is substantially similar to the first and second arrangements of the sleeve 3 and 103. It differs therefrom by the number and the locations of the orifices. The sleeve 203 has first, second, third, fourth, and fifth proximal orifices OP1, OP2, OP3, OP4, OP5 that are angularly distributed in the proximal radial plane PP, and first, second, third, fourth, and fifth distal orifices OD1, OD2, OD3, OD4, OD5 that are angularly distributed in the distal radial plane DD. As shown in FIGS. 22A to 24A, the second proximal orifice OD2 is offset by 45° clockwise relative to the first proximal orifice OD1. The third proximal orifice OP3 is offset by 90° clockwise relative to the second proximal orifice OP2. The fourth proximal orifice OP4 is offset by 45° clockwise relative to the third proximal orifice OP3. The fifth proximal orifice OP5 is offset by 45° clockwise relative to the fourth proximal orifice OP4. As shown in FIGS. 22B to 24B, the second distal orifice OD2 is offset by 90° clockwise relative to the first distal orifice OD1. The third distal orifice OD3 is offset by 90° clockwise relative to the second distal orifice OD2. The fourth distal orifice OD4 is offset by 45° clockwise relative to the third distal orifice OD3. The fifth distal orifice OD5 is offset by 45° clockwise relative to the fourth distal orifice OD4. In addition, the first distal orifice OD1 is offset by 45° counterclockwise relative to the first proximal orifice OP1.

Figure 22:
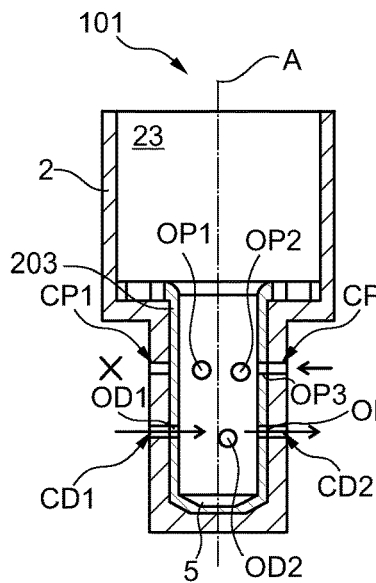
FIGS. 22, 22A, & 22B; 23, 23A, & 23B, and 24, 24A, & 24B are figures similar to FIGS. 14, 14A, & 14B of the reciprocating and rotary subassembly of the invention, with the first arrangement of the body, the second embodiment of the piston (not shown), and a third arrangement of the sleeve, the sleeve being shown respectively in a sixth, a seventh, and an eighth fluid-flow configuration.
Figure 22A:
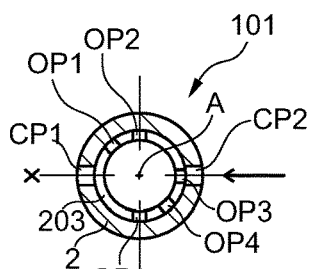
Figure 22B:
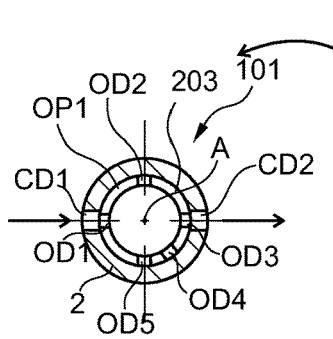

With reference to FIGS. 22, 22A, and 22B, the sleeve 203 is in the sixth fluid-flow configuration (cf. FIG. 39) in which the first, second, fourth, and fifth proximal orifices OP1, OP2, OP4, OP5, and the second, fourth, and fifth distal orifices OD2, OD4, OD5 are closed off by the sleeve 203, the third proximal orifice OP3 is facing the second proximal duct CP2, and the first and third distal orifices OD1, OD3 are facing respective ones of the first and second distal ducts CD1, CD2.

Figure 23:
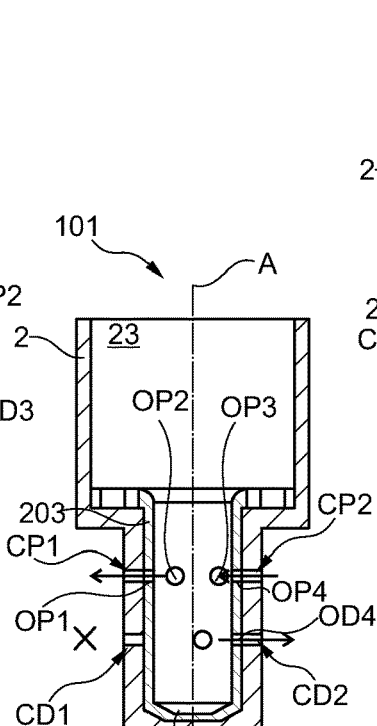
Figure 23A:
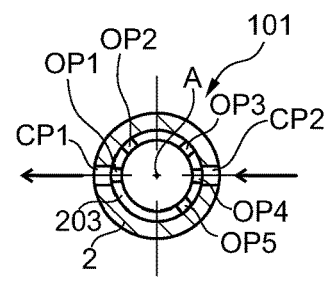
Figure 23B:
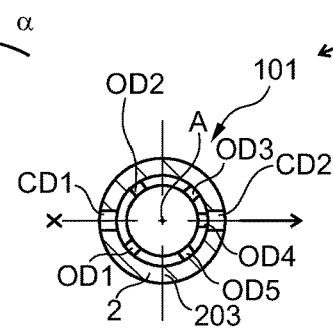

With reference to FIGS. 23, 23A, and 23B, the sleeve 203 is in the seventh fluid-flow configuration (cf. FIG. 40) in which the first and fourth proximal orifices OP1, OP4 are facing respective ones of the first and second proximal ducts CP1, CP2, the first, second, third, and fifth distal orifices OD1, OD2, OD3, OD5 are closed off by the sleeve 203, and the fourth distal orifice OD4 is facing the second distal duct CD2. To go from the sixth fluid-flow configuration to the seventh fluid-flow configuration, the sleeve 203 has been turned through an angle α of 45° relative to the body 2 counterclockwise as seen observing in a distal direction.

Figure 24:
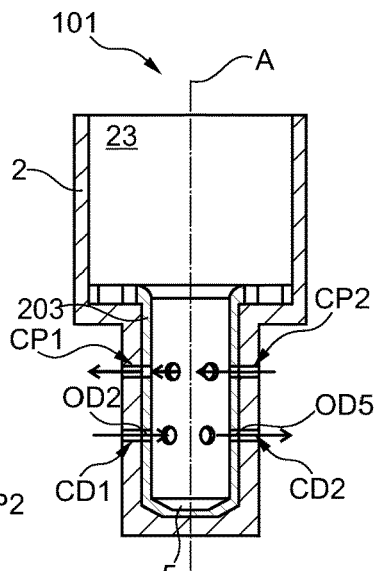
Figure 24A:
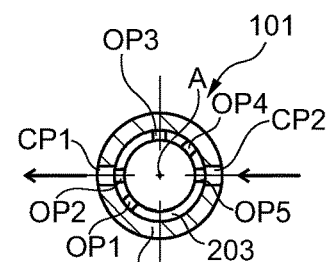
Figure 24B:
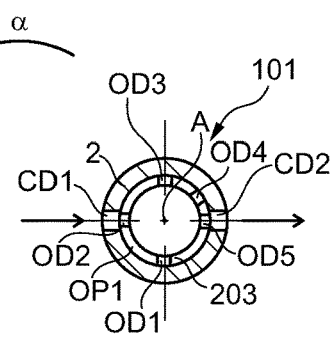
Figure 25:
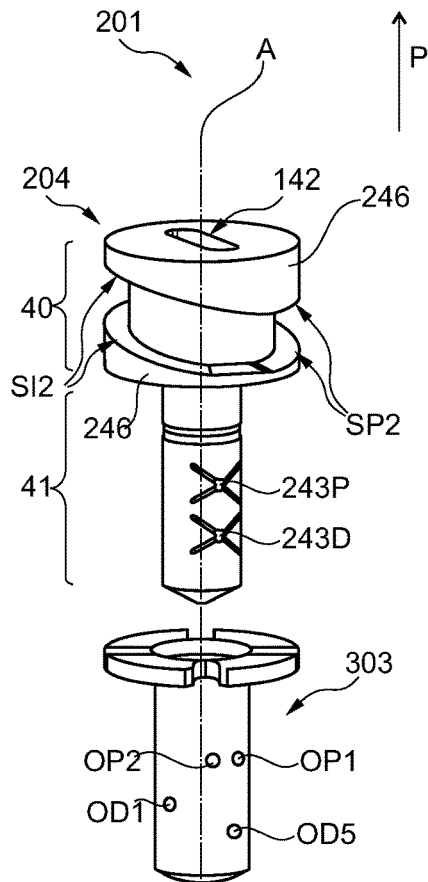
FIG. 25 is a perspective view of the reciprocating and rotary subassembly of the invention with the first arrangement of the body, a third embodiment of the piston, and a fourth arrangement of the sleeve, the body, the piston, and the sleeve being shown in the process of being assembled together.
Figure 26:
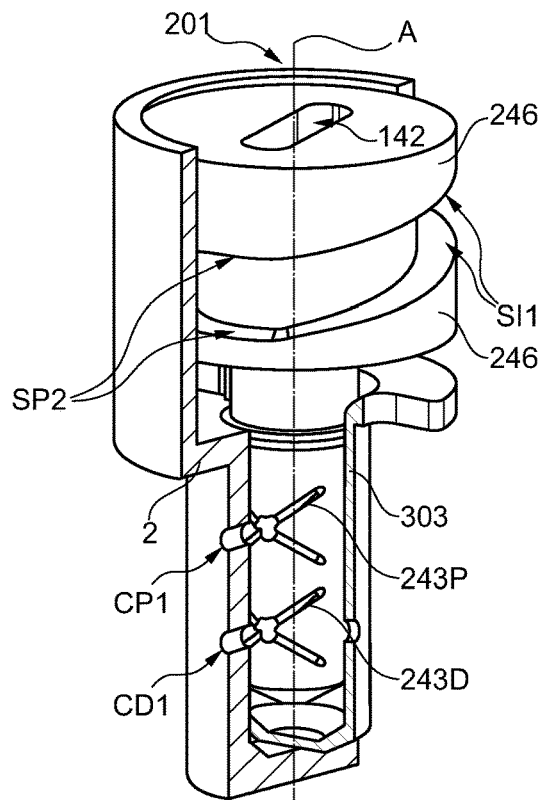
FIGS. 26 and 27 are similar to FIGS. 12 and 13 for the reciprocating and rotary subassembly of FIG. 25, the sleeve being shown in the first fluid-flow configuration.
Figure 27:
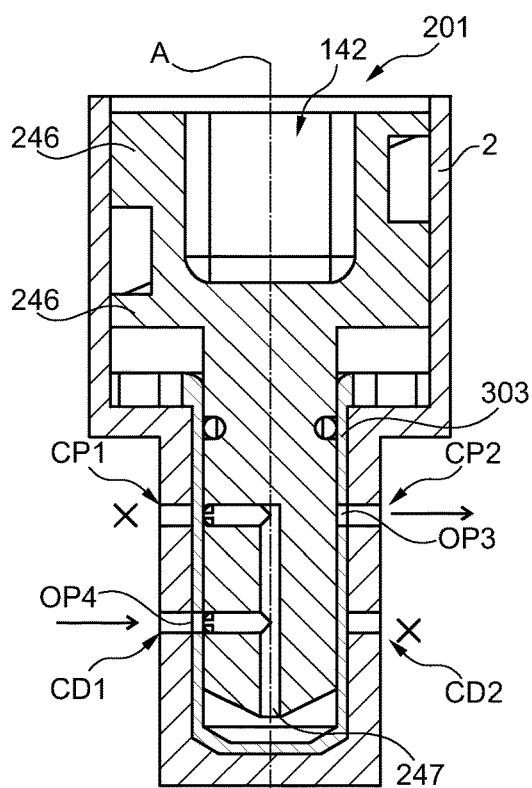

With reference to FIGS. 24, 24A, and 24B, the sleeve 203 is in the eighth fluid-flow configuration (cf. FIG. 41) in which the first and fifth proximal orifices OP1, OP5 are facing respective ones of the first and second proximal ducts CP1, CP2, and the second and fifth distal orifices OD2, OD5 are facing respective ones of the first and second distal ducts CD1, CD2. To go from the seventh fluid-flow configuration to the eighth fluid-flow configuration, the sleeve 203 has been turned through an angle α of 45° relative to the body 2 counterclockwise as seen observing in a distal direction.

In a variant embodiment (not shown), the angles separating the orifices of the sleeve are different and make additional fluid-flow configurations possible. Thus, the number and locations of the orifices are chosen as a function of the desired fluid-flow configurations.

In another embodiment (not shown), the ducts provided in the body are not mutually diametrically opposite, but rather they are disposed at an angle chosen, for example, as a function of the desired fluid-flow connection configuration. The orifices of the sleeve and the recesses of the piston are arranged accordingly.

With reference to FIGS. 25 to 31, the reciprocating and rotary subassembly 201 of the invention has the first arrangement of the body 2, a fourth arrangement of the sleeve 303, and a third embodiment of the piston 204.

The third embodiment of the piston 204 is substantially similar to the second embodiment of the piston 104. It differs therefrom mainly in that the distal recess 143D and the proximal recess 143P are mutually aligned longitudinally. As indicated above, it is possible for the ducts in the body not to be mutually diametrically opposite, but rather disposed at any other suitable angle, the orifices of the sleeve and the recesses of the piston being arranged accordingly.

In the same way as for the second embodiment, the piston 204 has a channel 247 made up of a longitudinal segment, of a distal radial segment, and of a proximal radial segment.

With reference, in particular, to FIGS. 28A & 28B to 33A & 33B, the fourth arrangement of the sleeve 303 differs from the preceding embodiments by the number and locations of the orifices. It has first, second, third, fourth, and fifth proximal orifices OP1, OP2, OP3, OP4, OP5 mutually disposed similarly to the proximal orifices of the sleeve 203 of the third arrangement, and first, second, third, fourth, and fifth distal orifices OD1, OD2, OD3, OD4, OD5 mutually disposed similarly to the distal orifices of the sleeve 203 of the third arrangement with, however, the first distal orifice OD1 offset by 90° clockwise relative to the first proximal orifice OP1. This sleeve 303 makes it possible, by successive movements in rotation through an angle α of 45°, for the following fluid-flow configurations to be taken up:
  with reference to FIGS. 28, 28A, and 28B, the second fluid-flow configuration (cf. FIG. 35);
  with reference to FIGS. 29, 29A, and 29B, the third fluid-flow configuration (cf. FIG. 36);
  with reference to FIGS. 30, 30A, and 30B, the first fluid-flow configuration (cf. FIG. 34); or the symmetrical first fluid-flow configuration (not shown); and
  with reference to FIGS. 31, 31A, and 31B, the eighth fluid-flow configuration (cf. FIG. 41).

The same sleeve 303 thus makes it possible for four distinct fluid-flow configurations to be taken up, not counting the symmetrical first fluid-flow configuration.

Figures 31, 32, 33:
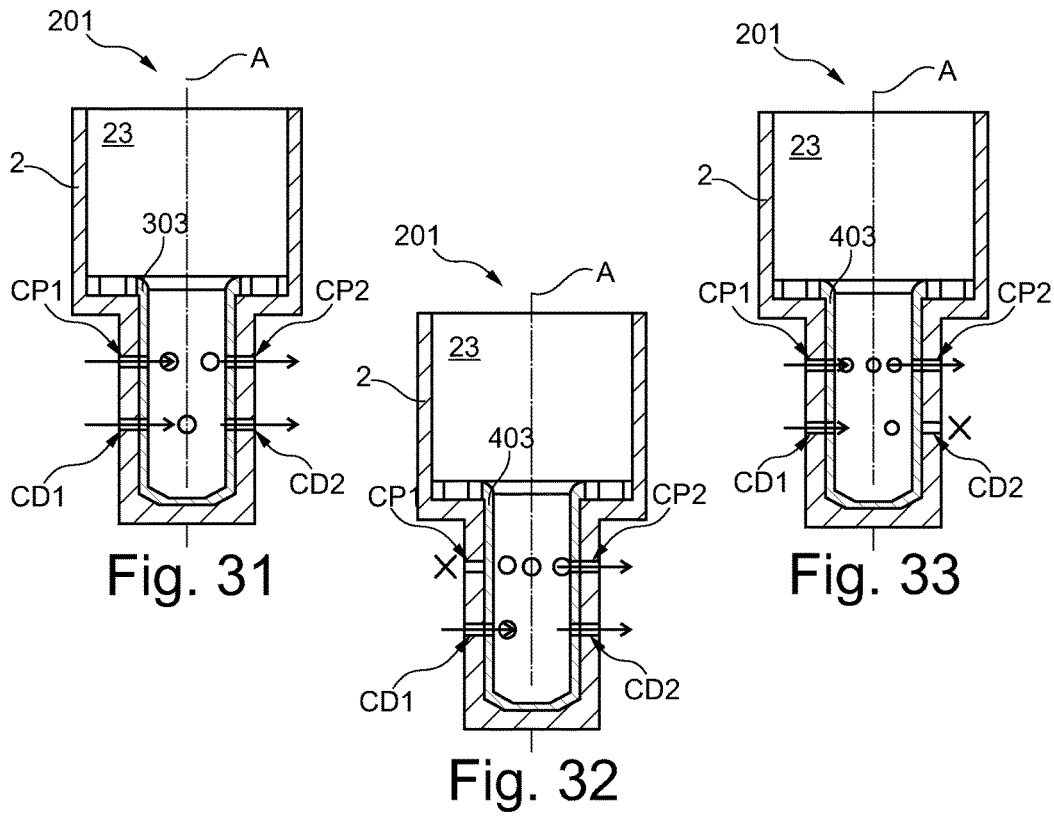
Figures 31A, 32A, 33A:
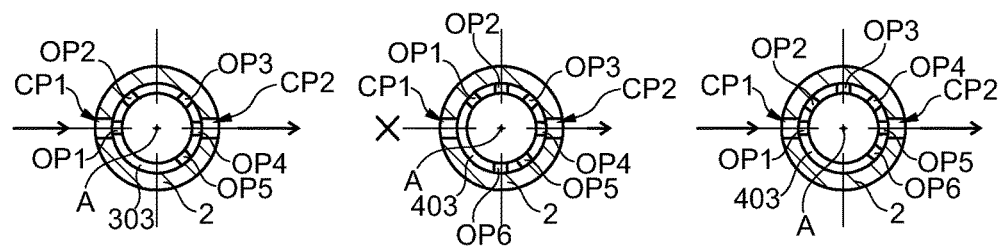
Figures 31B, 32B, 33B:
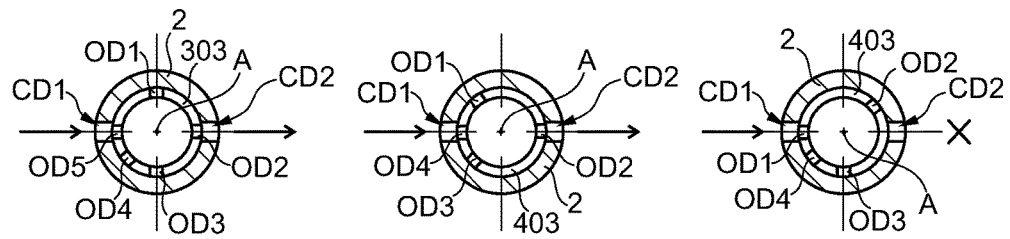

With reference to FIGS. 32 to 33B, the reciprocating and rotary device 201 has a fifth arrangement of the sleeve 403.

The fifth arrangement of the sleeve 403 differs from the preceding arrangements by the number and locations of the orifices. It has first, second, third, fourth, fifth, and sixth proximal orifices OP1, OP2, OP3, OP4, OP5, and OP6 that are angularly distributed in the proximal radial plane PP, and first, second, third, and fourth distal orifices OD1, OD2, OD3, OD4, that are angularly distributed in the distal radial plane DD. As can be seen in FIGS. 32A and 33A, the first, second, third, fourth, fifth, and sixth proximal orifices OP1, OP2, OP3, OP4, OP5, OP6 are offset in pairs by 45° clockwise.

As shown in FIGS. 32B and 33B, the second distal orifice OD2 is offset by 135° clockwise relative to the first distal orifice OD1. The third distal orifice OD3 is offset by 135° clockwise relative to the second distal orifice OD2. The fourth distal orifice OD4 is offset by 45° clockwise relative to the third distal orifice OD3. In addition, the first distal orifice OD1 is longitudinally aligned with the first proximal orifice OP1.

This sleeve 403 makes it possible, by successive movements in rotation through an angle α of 45°, for the following fluid-flow configurations to be taken up:
  with reference to FIGS. 32, 32A, and 32B, the sixth fluid-flow configuration (cf. FIG. 39); and
  with reference to FIGS. 33, 33A, and 33B, the symmetrical seventh fluid-flow configuration (cf. FIG. 39).

The same sleeve 403 also makes it possible for the first fluid-flow configuration (cf. FIGS. 34, 30, 30A, and 30B) and the second fluid-flow configuration (cf. FIGS. 36, 29, 29A, and 29B) to be taken up.

With the preceding examples, it can be understood that the orifices are provided in the sleeve as a function of the combinations of fluid-flow configurations desired for each specific application of the reciprocating and rotary device 1, 101, 201 of the invention.

With reference to FIGS. 42 to 46D, the reciprocating and rotary device 301 of the invention has a second arrangement of the body 102, a fifth arrangement of the sleeve 503, and a fourth embodiment of the piston 304.

The second arrangement of the body 102 differs from the preceding arrangements of the body in that the four ducts CP, CR, CS, CD are mutually superposed in longitudinal alignment so that all of the fluid-flow connections of the reciprocating and rotary device 301 take place on the same side. The body 102 thus has a proximal duct CP situated in a proximal plane PP, a distal duct CD situated in a distal plane DD as well as an intermediate proximal duct CR situated in an intermediate proximal plane RR, and an intermediate distal duct CS situated in an intermediate distal plane SS.

Figure 42:
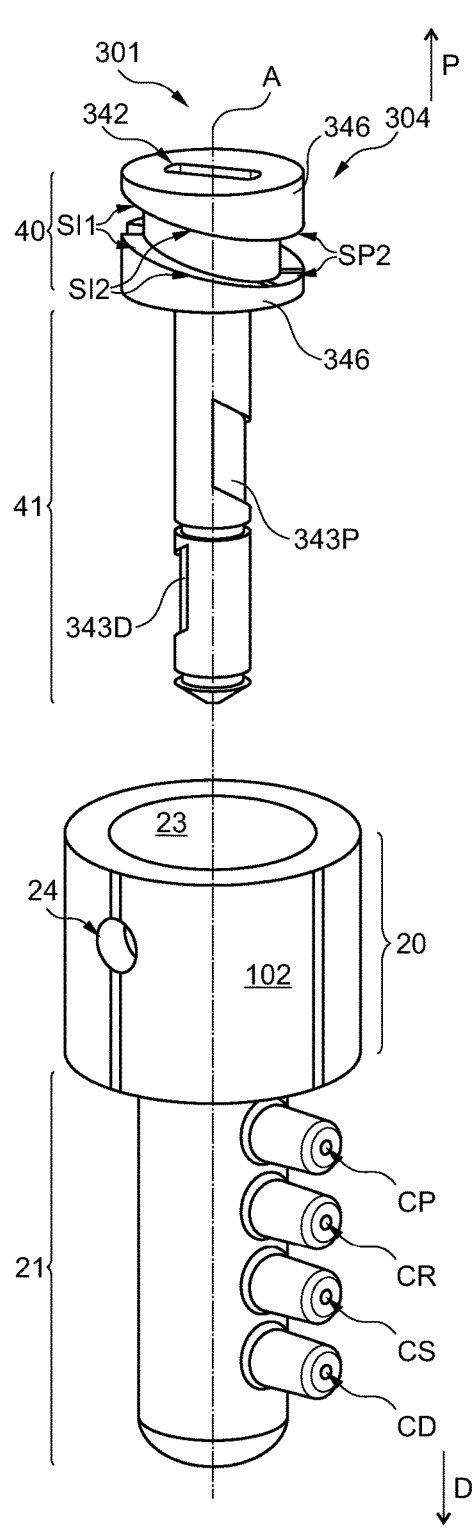
FIG. 42 is a perspective view of the reciprocating and rotary subassembly of the invention, with a second arrangement of the body, a fourth embodiment of the piston, the body and the piston being shown in the process of being assembled together, the sleeve not being shown.
Figure 43:
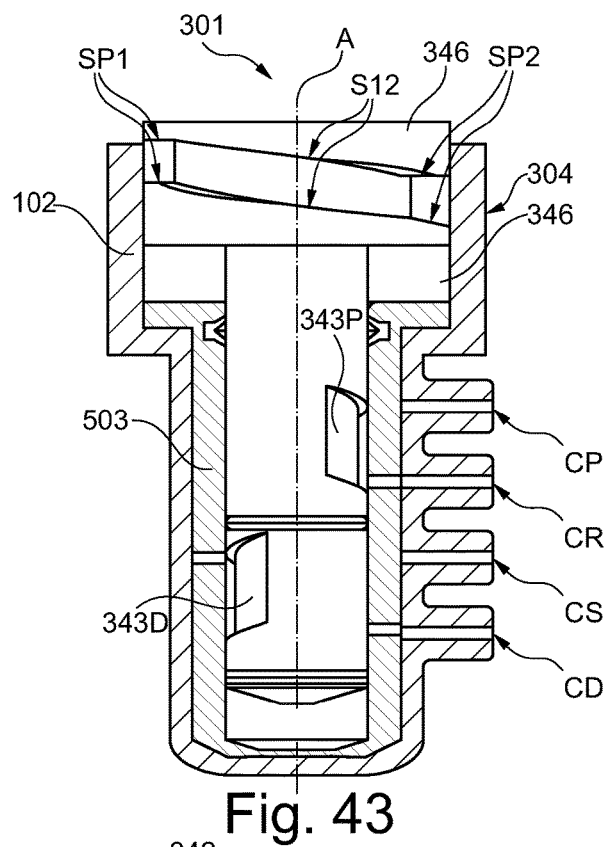
FIGS. 43 and 44 are axial section views of the reciprocating and rotary subassembly of FIG. 42, with a fifth arrangement of the sleeve being shown in a ninth fluid-flow configuration.
Figure 44:
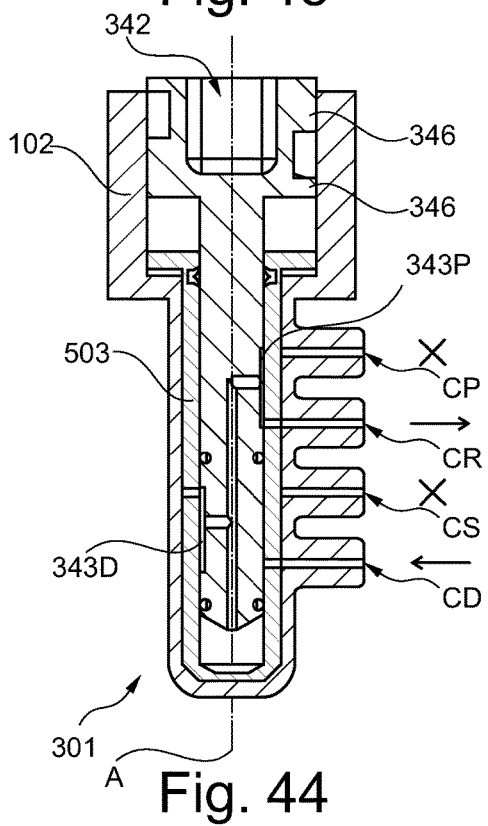
Figure 49:
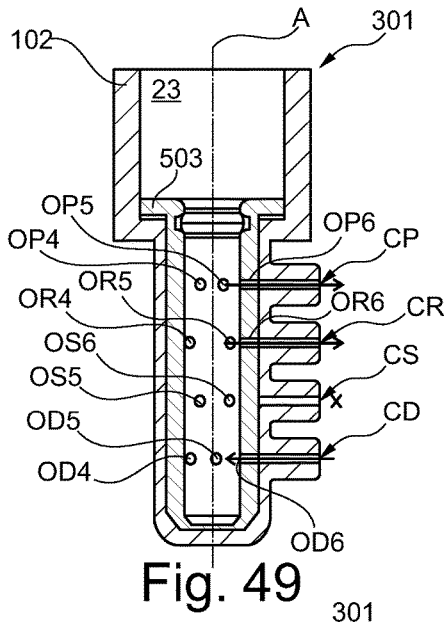
Figure 50:
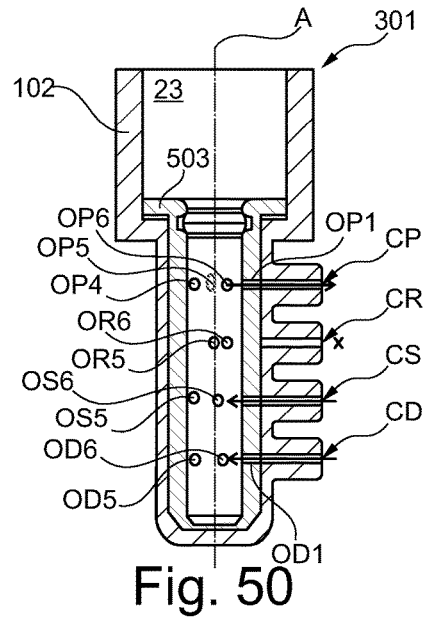
Figure 49A:
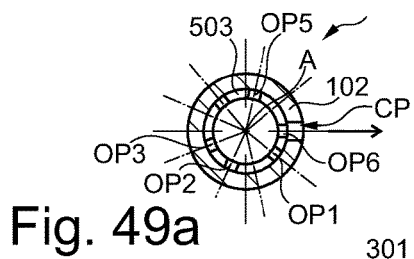
Figure 50A:
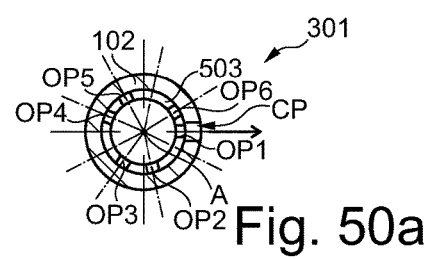
Figure 49B:
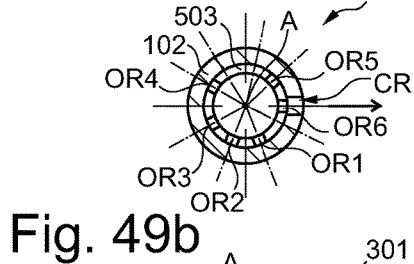
Figure 50B:
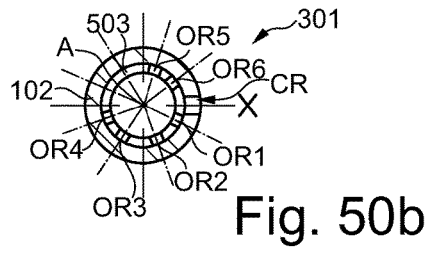
Figure 49C:
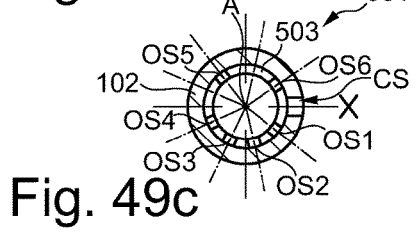
Figure 50C:
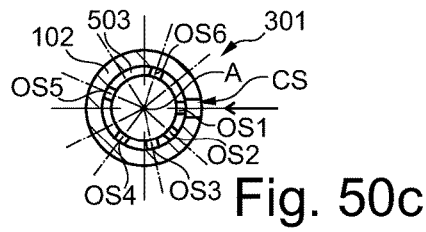
Figure 49D:
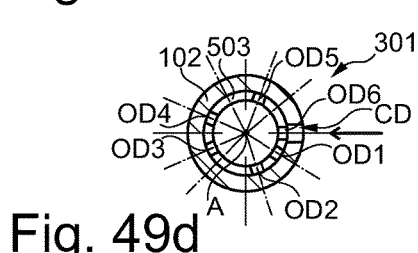
Figure 50D:
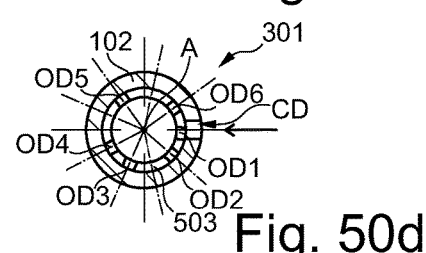
Figure 51:
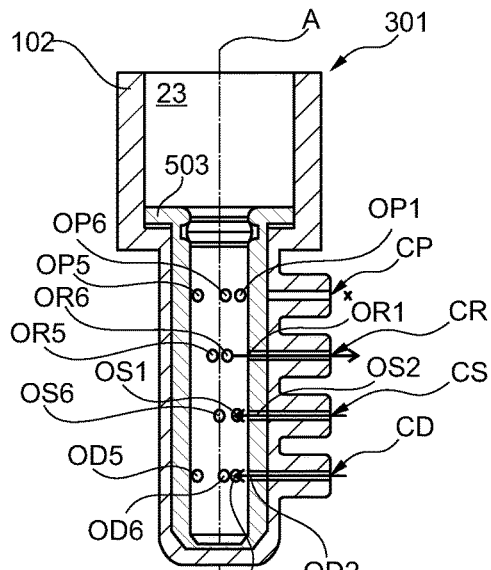
Figure 52:
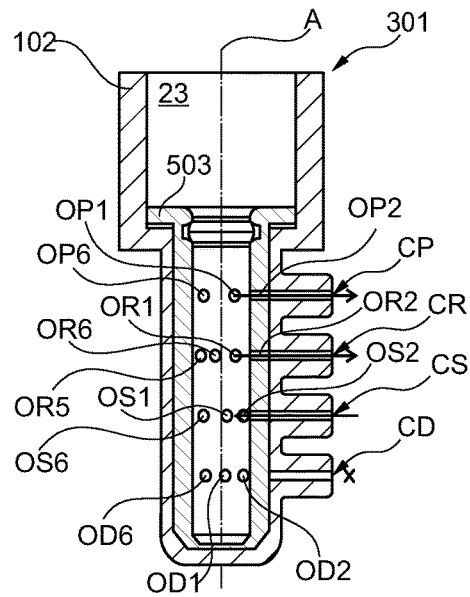
Figure 51A:
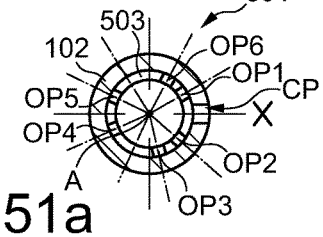
Figure 51B:
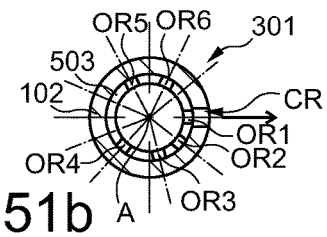
Figure 51C:
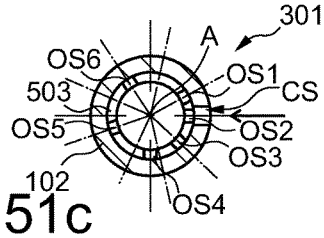
Figure 51D:
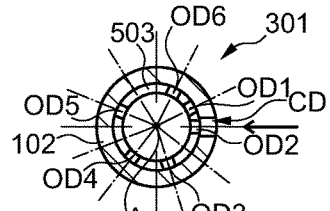
Figure 52A:
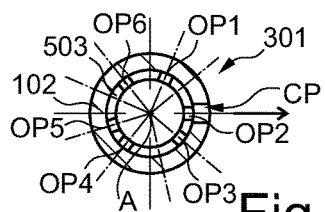
Figure 52B:
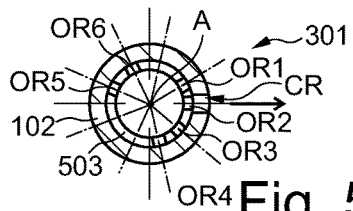
Figure 52C:
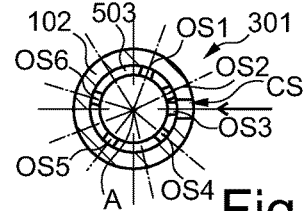
Figure 52D:
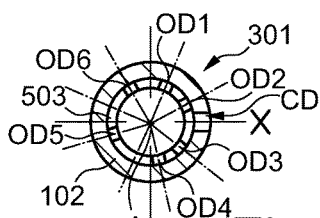
Figure 53:
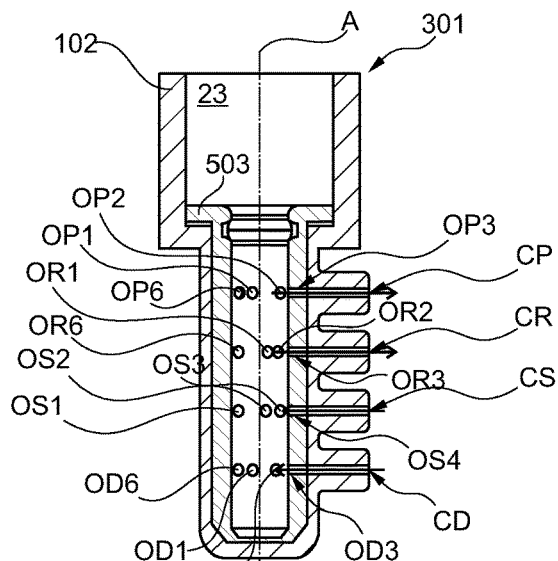
Figure 53A:
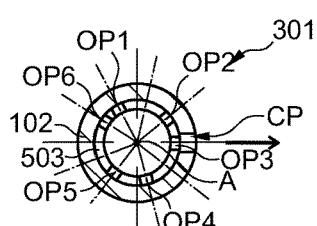
Figure 53B:
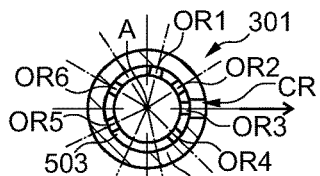
Figure 53C:
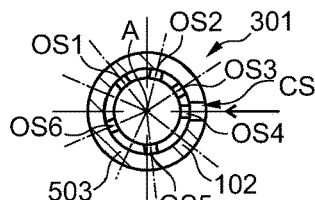
Figure 53D:
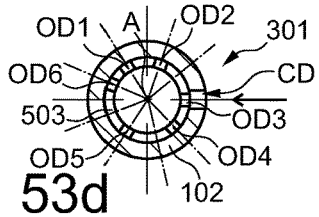
Figure 54:
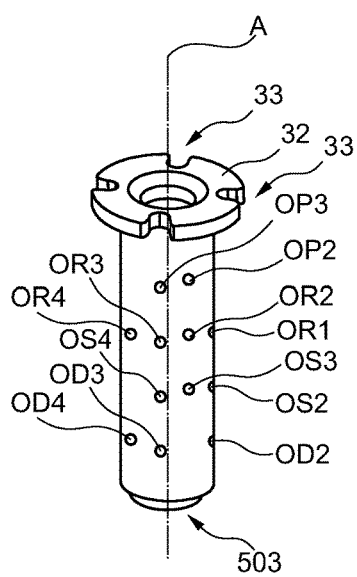
FIG. 54 is a perspective view of the sleeve of the reciprocating and rotary subassembly of FIGS. 42 to 53.

With reference to FIGS. 42 to 44, the fourth embodiment of the piston 304 is substantially similar to the second embodiment of the piston. It differs therefrom in that each recess, be it proximal 143P or distal 143D, is in the form of an inclined slot that extends sufficiently far longitudinally to cover, simultaneously, the proximal duct CP and the intermediate proximal duct CR, or the distal duct CD and the intermediate distal duct CS.

The fifth arrangement of the sleeve 503 is shown by FIGS. 45 to 54. It has six proximal orifices OP1, OP2, OP3, OP4, OP5, OP6 distributed in the proximal plane PP, six distal orifices OD1, OD2, OD3, OD4, OD5, OD6 distributed in the distal plane DD, and six intermediate proximal orifices OR1, OR2, OR3, OR4, OR5, OR6 distributed in the intermediate proximal plane RR, and six intermediate distal orifices OS1, OS2, OS3, OS4, OS5, OS6 distributed in the intermediate distal plane SS. In addition, the proximal, distal, intermediate proximal, and intermediate distal orifices are mutually arranged in longitudinal planes that are offset relative to one another by 40°.

As shown in FIGS. 45A to 53A, the second proximal orifice OP2 is offset by 80° clockwise relative to the first proximal orifice OP1. The third proximal orifice OP3 is offset by 40° clockwise relative to the second proximal orifice OP2. The fourth proximal orifice OP4 is offset by 80° clockwise relative to the third proximal orifice OP3. The fifth proximal orifice OP5 is offset by 40° clockwise relative to the fourth proximal orifice OP4. The sixth proximal orifice OP6 is offset by 80° clockwise relative to the fifth proximal orifice OP5.

As shown in FIGS. 45B to 53B, the second intermediate proximal orifice OR2 is offset by 40° clockwise relative to the first intermediate proximal orifice OR1. The third intermediate proximal orifice OR3 is offset by 40° clockwise relative to the second intermediate proximal orifice OR2. The fourth intermediate proximal orifice OR4 is offset by 40° clockwise relative to the third intermediate proximal orifice OR3. The fifth intermediate proximal orifice OR5 is offset by 120° clockwise relative to the fourth intermediate proximal orifice OR4. The sixth intermediate proximal orifice OR6 is offset by 40° clockwise relative to the fifth intermediate proximal orifice OR5. In addition, the first intermediate distal orifice OR1 is offset by 40° clockwise relative to the first proximal orifice OP1.

As shown in FIGS. 45C to 53C, the second intermediate distal orifice OS2 is offset by 40° clockwise relative to the first intermediate distal orifice OS1. The third intermediate distal orifice OS3 is offset by 40° clockwise relative to the second intermediate distal orifice OS2. The fourth intermediate distal orifice OS4 is offset by 40° clockwise relative to the third intermediate distal orifice OS3. The fifth intermediate distal orifice OS5 is offset by 80° clockwise relative to the fourth intermediate distal orifice OS4. The sixth intermediate distal orifice OS6 is offset by 80° clockwise relative to the fifth intermediate distal orifice OS5. In addition, the first intermediate distal orifice OS1 is offset by 40° counterclockwise relative to the first intermediate proximal orifice OR1.

As shown in FIGS. 45D to 53D, the second distal orifice OD2 is offset by 40° clockwise relative to the first distal orifice OD1. The third distal orifice OD3 is offset by 80° clockwise relative to the second distal orifice OD2. The fourth distal orifice OD4 is offset by 40° clockwise relative to the third distal orifice OD3. The fifth distal orifice OD5 is offset by 80° clockwise relative to the fourth distal orifice OD4. The sixth distal orifice OD6 is offset by 80° clockwise relative to the fifth distal orifice OD5. In addition, the first distal orifice OD1 is longitudinally aligned with the first intermediate distal orifice OS1.

With reference to FIGS. 45, 45A, 45B, 45C, and 45D, the sleeve 503 is in a ninth fluid-flow configuration in which the proximal duct CP is closed off by the sleeve 503, the fourth intermediate proximal orifice OR4 is facing the intermediate proximal duct CR, which is open, the intermediate distal duct CS is closed off by the sleeve 503, and the fourth distal orifice OD4 is facing the distal duct CD, which is open. Thus, in this ninth fluid-flow configuration, the fluid can be admitted via the distal duct CD and delivered via the intermediate proximal duct CP, or vice versa.

With reference to FIGS. 46, 46A, 46B, 46C, and 46D, the sleeve 503 is in a tenth fluid-flow configuration in which the fourth proximal orifice OP4 is facing the proximal duct CP, which is open, the intermediate proximal duct CR is closed off by the sleeve 503, the fifth intermediate distal orifice OS5 is facing the intermediate distal duct CS, which is open, and the fourth distal orifice OD4 is closed off by the sleeve 503. Thus, in this tenth fluid-flow configuration, the fluid can be admitted via the intermediate distal duct CS and delivered via the proximal duct CP, or vice versa.

With reference to FIGS. 47, 47A, 47B, 47C, and 47D, the sleeve 503 is in an eleventh fluid-flow configuration in which the fifth proximal orifice OP5 is facing the proximal duct CP, which is open, the intermediate proximal duct CR is closed off by the sleeve 503, the intermediate distal duct CS is closed off by the sleeve 503, and the fifth distal orifice OD5 is facing the fourth distal duct CD4, which is open. Thus, in this eleventh fluid-flow configuration, the fluid can be admitted via the distal duct CD and delivered via the proximal duct CP, or vice versa.

With reference to FIGS. 48, 48A, 48B, 48C, and 48D, the sleeve 503 is in a twelfth fluid-flow configuration in which the proximal duct CP is closed off by the sleeve 503, the fifth intermediate proximal orifice OR5 is facing the intermediate proximal duct CR, which is open, the sixth intermediate distal orifice OS6 is facing the intermediate distal duct CS, which is open, and the distal duct CD is closed off by the sleeve 503. Thus, in this twelfth fluid-flow configuration, the fluid can be admitted via the intermediate distal duct CS and delivered via the intermediate proximal duct CR, or vice versa.

With reference to FIGS. 49, 49A, 49B, 49C, and 49D, the sleeve 503 is in a thirteenth fluid-flow configuration in which the sixth proximal orifice OP6 is facing the proximal duct CP, which is open, the sixth intermediate proximal orifice OR6 is facing the intermediate proximal duct CR, which is open, the intermediate distal duct CS is closed off by the sleeve 503, and the sixth distal orifice OD6 is facing the distal duct CD, which is open. Thus, in this thirteenth fluid-flow configuration, the fluid can be admitted via the distal duct CD and delivered via the intermediate proximal and proximal ducts CR, CP, or vice versa.

With reference to FIGS. 50, 50A, 50B, 50C, and 50D, the sleeve 503 is in a fourteenth fluid-flow configuration in which the first proximal orifice OP1 is facing the proximal duct CP, which is open, the intermediate proximal duct CR is closed off by the sleeve 503, the first intermediate distal orifice OS1 is facing the intermediate distal duct CS, which is open, and the first distal orifice OD1 is facing the distal duct CD, which is open. Thus, in this fourteenth fluid-flow configuration, the fluid can be admitted via the distal duct CD and the intermediate distal duct CS, and delivered via the proximal duct CP, or vice versa.

With reference to FIGS. 51, 51A, 51B, 51C, and 51D, the sleeve 503 is in a fifteenth fluid-flow configuration in which the first proximal duct CP is closed off by the sleeve 503, the first intermediate proximal orifice OR1 is facing the intermediate proximal duct CR, which is open, the intermediate distal orifice OS2 is facing the intermediate distal duct CS, which is open, and the second distal orifice OD2 is facing the distal duct CD, which is open. Thus, in this fifteenth fluid-flow configuration, the fluid can be admitted via the distal duct CD and the intermediate distal duct CS, and delivered via the intermediate proximal duct CR, or vice versa.

With reference to FIGS. 52, 52A, 52B, 52C, and 52D, the sleeve 503 is in a sixteenth fluid-flow configuration in which the second proximal orifice OP2 is facing the proximal duct CP, which is open, the second intermediate proximal orifice OR2 is facing the intermediate proximal duct CR, which is open, the third intermediate distal orifice OS3 is facing the intermediate distal duct CS, which is open, and the distal duct CD is closed off by the sleeve 503. Thus, in this sixteenth fluid-flow configuration, the fluid can be admitted via the intermediate distal duct CS and delivered via the intermediate proximal and proximal ducts CR, CP, or vice versa.

Finally, with reference to FIGS. 53, 53A, 53B, 53C, and 53D, the sleeve 503 is in a seventeenth fluid-flow configuration in which the third proximal orifice OP3 is facing the proximal duct CP, which is open, the third intermediate proximal orifice OR3 is facing the intermediate proximal duct CR, which is open, the fourth intermediate distal orifice OS4 is facing the intermediate distal duct CS, which is open, and the third distal orifice OD3 is facing the distal duct CD, which is open. Thus, in this sixteenth fluid-flow configuration, all of the ducts are open, and the fluid can be admitted via the distal duct CD and the intermediate distal duct CS, and delivered via the intermediate proximal duct CR and the proximal duct CP, or vice versa.

In the preceding examples, to go from one fluid-flow configuration to the next, the sleeve 503 has been turned through an angle α of 40° relative to the body 102 counterclockwise as seen observing in a distal direction.

The same sleeve 503 thus makes nine distinct fluid-flow configurations possible. Naturally, this number may be lower.

Naturally, the reciprocating and rotary subassembly of the invention may have additional ducts and additional orifices provided respectively in the body and in the sleeve, these additional ducts and orifices being provided in radial planes that are intermediate to the above-described radial planes.

The reciprocating and rotary pumping device of the invention includes a reciprocating and rotary subassembly 1, 101, 201, 301 as described above, in which the piston is mechanically coupled to drive means of known type. This mechanical coupling may be implemented by removable mechanical coupling means suitable for being easily decoupled from the piston 4; 104; 204; 304. Thus, the drive means can form a re-usable subassembly when the reciprocating and rotary subassembly 1, 101, 201, 301 forms a disposable subassembly. Moving the sleeve 3; 103; 203; 303; 403; 503 between the various fluid-flow configurations may be obtained manually or in motor-driven manner by any known means co-operating with the drive shapes provided on the sleeve 3; 103; 203; 303; 403; 503.

With the reciprocating and rotary subassembly 1, 101, 201, 301 and the reciprocating and rotary pumping device of the invention, the fluid-flow communication between the ducts and the working chamber 5 is obtained via the sleeve 3, 103, 203, 303, 403, 503. The invention thus makes it possible to achieve the above-mentioned objects by increasing, for a predetermined number of ducts, the number of possible fluid-flow configurations, while also maintaining simplicity, compactness, and a small number of parts. Thus, merely by the sleeve 3, 103, 203, 303, 403, 503 being moved in the body 2, 102, the reciprocating and rotary device 1, 101, 201, 301 of the invention allows various fluid-flow connections to be achieved, making varied applications possible without changing the body 2, 102, or the piston 4, 104, 204, 304, or the sleeve 3, 103, 203, 303, 403, 503 of the reciprocating and rotary device 1, 101, 201, 301.

Naturally, the present invention is in no way limited to the above description of one of its embodiments, which can undergo modifications without going beyond the ambit of the invention.

Thus, in the examples shown, the sleeve is mounted to move angularly relative to the body. In analogous manner, the sleeve may be designed in such manner as to slide longitudinally relative to the body, changing from one fluid-flow configuration to another then taking place by the chamber being moved in translation in the body. The orifices used from one fluid-flow configuration to another are then mutually aligned longitudinally, the spacing between the orifices varying depending on the fluid-flow communications to be achieved or not to be achieved. The movement in translation and the movement in rotation of the sleeve relative to the body may also be combined. In addition, the sleeve may be provided without an end-wall, in the form of a sheath that is open at both of its ends. Various options are then possible. The longitudinal wall of the sleeve may extend to the end wall of the body. The longitudinal wall may also be interrupted under the distal duct, it then being possible for the body to have an inside diameter of reduced section limiting the dead volume around the piston when said piston is in its distal position. In this second configuration, the working chamber is, at least in part, delimited directly by the wall of the body.

In addition, in the examples shown, the body has at least two proximal ducts and at least two distal ducts. Naturally, the multiplexing is possible with a body having two proximal ducts and a single distal duct, or a single proximal duct and two distal ducts.

Finally, the examples shown relate to a single-acting single-stage reciprocating and rotary subassembly. In variant embodiments (not shown), the reciprocating and rotary subassembly may also have a multi-acting configuration. To this end, in commonly accepted manner, it then has a plurality of stages.

What is claimed is:

1. A reciprocating and rotary subassembly for positive displacement pumping of a fluid, which subassembly comprises:
   a hollow body having a longitudinal axis defining at least one cavity and having its wall provided with a plurality of through ducts,
   a piston received in said cavity, with which the piston co-operates to define a working chamber, said piston having, in its periphery, at least one recess in fluid-flow communication with said working chamber, said piston being suitable for being moved in reciprocating and rotary manner relative to said body so as to be movable angularly between different operating positions, in each of which said recess is facing or not facing at least one of said through ducts, and so as to be movable in translation in such a manner as to cause a volume of said working chamber to vary so as to suck in and then deliver said fluid successively,
   a sleeve mounted to be movable angularly and longitudinally between said piston and said body, a wall of said sleeve is provided with a plurality of through orifices, which sleeve is interposed radially between said piston and said body, and is suitable for taking up different successive fluid-flow configurations in said body and in association with each operating position, in each of which fluid-flow configurations each through duct is selectively closed when said sleeve prevents fluid-flow communication between said working chamber and said through duct, or open when an orifice of said sleeve facing said through duct allows fluid-flow communication to take place between said working chamber and said through duct,
   wherein, in one of the fluid-flow configurations, a first through duct and a second through duct of said through ducts are open while a third through duct of said through ducts is closed, so that a fluid flow can selectively occur between the first through duct and the second through duct via the working chamber, and, in another one of the fluid-flow configurations, the first through duct and the third through duct of said through ducts are open while the second through duct of said through ducts is closed so that a fluid flow can selectively occur between the first through duct and the third through duct via the working chamber, whereby the subassembly is configured to perform fluidic multiplexing.

2. The reciprocating and rotary subassembly according to claim 1, wherein said sleeve is provided with drive shapes that can change the angular and/or longitudinal position of said sleeve relative to said body.

3. The reciprocating and rotary subassembly according to claim 1, wherein the number of said orifices is greater than the number of said through ducts.

4. The reciprocating and rotary subassembly according to claim 1, wherein said body is provided with at least two proximal ducts situated in a proximal radial plane, with at least two distal ducts situated in a distal radial plane distinct from said proximal radial plane, in that said sleeve is provided with proximal orifices situated in said proximal radial plane and angularly offset mutually, and with distal orifices situated in said distal radial plane and angularly offset mutually.

5. The reciprocating and rotary subassembly according to claim 4, wherein said proximal and distal ducts and said proximal and distal orifices are angularly disposed such that said sleeve can successively take up at least two of the following fluid-flow configurations:
- a first and a fifth fluid-flow configuration in which only one of said proximal ducts is open, and only one of said distal ducts is open;
- a second fluid-flow configuration in which each of said proximal ducts is open, and each of said distal ducts is closed;
- a third fluid-flow configuration in which each of said proximal ducts is closed, and each of said distal ducts is open;
- a fourth fluid-flow configuration in which each of said proximal ducts and each of said distal ducts is closed;
- a sixth fluid-flow configuration in which each of said proximal ducts is open, and each of said distal ducts is open;
- a seventh fluid-flow configuration in which only one of said proximal ducts is open, and only one of said distal ducts is open; and
- an eighth fluid-flow configuration in which each of said proximal ducts and each of said distal ducts is open.

6. The reciprocating and rotary subassembly according to claim 1, wherein said body has at least: a proximal duct situated in a proximal radial plane; a distal duct situated in a distal radial plane distinct from said proximal radial plane; and a proximal intermediate duct and a distal intermediate duct, which said proximal intermediate duct and said distal intermediate duct are situated respectively in an intermediate proximal radial plane and in an intermediate distal radial plane that are provided between said proximal radial plane and said distal radial plane; in that said sleeve is provided with at least: proximal orifices situated in said proximal radial plane; distal orifices situated in said distal radial plane; proximal intermediate orifices situated in said radial intermediate plane; and distal intermediate orifices situated in said distal intermediate plane.

7. The reciprocating and rotary subassembly according to claim 6, wherein said proximal duct, said proximal intermediate duct, said distal intermediate duct, and said distal duct are mutually aligned longitudinally.

8. The reciprocating and rotary subassembly according to claim 6, wherein said proximal, proximal intermediate, distal intermediate, and distal ducts, and said proximal, proximal intermediate, distal intermediate and distal orifices are angularly superposed in such manner that said sleeve can successively take up at least two of the following fluid-flow configurations:
- a ninth fluid-flow configuration in which each of said proximal and intermediate distal ducts is closed, and each of said intermediate proximal and distal ducts is open;
- a tenth fluid-flow configuration in which each of said proximal and intermediate distal ducts is open, and each of said intermediate proximal and distal ducts is closed;
- an eleventh fluid-flow configuration in which each of said proximal and distal ducts is open, and each of said intermediate proximal and intermediate distal ducts is closed;
- a twelfth fluid-flow configuration in which each of said proximal and distal ducts is closed, and each of said intermediate proximal and intermediate distal ducts is open;
- a thirteenth fluid-flow configuration in which each of said proximal, intermediate proximal, and distal ducts is open, and said intermediate distal duct is closed;
- a fourteenth fluid-flow configuration in which each of said proximal, intermediate distal, and distal ducts is open, and said intermediate proximal duct is closed;
- a fifteenth fluid-flow configuration in which each of said proximal, intermediate proximal, and intermediate distal ducts is open, and said distal duct is closed; and
- a sixteenth fluid-flow configuration in which each of said proximal, intermediate proximal, intermediate distal, and distal ducts is open.

9. A reciprocating and rotary pumping device for fluid, comprising:
a reciprocating and rotary subassembly for pumping a fluid according to claim 1, and removable mechanical coupling means for mechanically coupling drive means to said piston in disassemblable manner.

10. A reciprocating and rotary pumping device for fluid, comprising:
a reciprocating and rotary subassembly according to claim 2, and removable mechanical coupling means for mechanically coupling drive means to said piston in disassemblable manner.

* * * * *